(12) United States Patent
Ku et al.

(10) Patent No.: US 12,386,455 B2
(45) Date of Patent: Aug. 12, 2025

(54) INPUT SENSOR AND A DISPLAY DEVICE FOR SENSING A TOUCH INPUT AND A PEN INPUT

(71) Applicant: Samsung Display Co., Ltd., Yongin-Si (KR)

(72) Inventors: Kyowon Ku, Yongin-si (KR); Gwang-Bum Ko, Yongin-si (KR); Kangwon Lee, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/242,727

(22) Filed: Sep. 6, 2023

(65) Prior Publication Data

US 2024/0184397 A1 Jun. 6, 2024

(30) Foreign Application Priority Data

Dec. 2, 2022 (KR) .......... 10-2022-0166963

(51) Int. Cl.
 *G06F 3/041* (2006.01)
 *G06F 3/044* (2006.01)

(52) U.S. Cl.
 CPC ........ *G06F 3/04166* (2019.05); *G06F 3/0445* (2019.05); *G06F 2203/04111* (2013.01)

(58) Field of Classification Search
 CPC ............... G06F 3/04166; G06F 3/0445; G06F 2203/04111
 See application file for complete search history.

(56) References Cited

U.S. PATENT DOCUMENTS

| | | | |
|---|---|---|---|
| 8,493,359 B2 | 7/2013 | Wright et al. | |
| 10,545,605 B2 | 1/2020 | Kim et al. | |
| 11,029,790 B2 | 6/2021 | Ju et al. | |
| 11,249,582 B2 * | 2/2022 | Kim | G09G 3/20 |
| 2013/0113743 A1 * | 5/2013 | Han | G06F 3/046 345/173 |
| 2013/0321295 A1 * | 12/2013 | Lin | G06F 3/0442 345/173 |

(Continued)

FOREIGN PATENT DOCUMENTS

| | | |
|---|---|---|
| KR | 10-2013-0128380 | 11/2013 |
| KR | 10-1661693 | 10/2016 |

(Continued)

*Primary Examiner* — Ariel A Balaoing
(74) *Attorney, Agent, or Firm* — F. CHAU & ASSOCIATES, LLC

(57) ABSTRACT

An input sensor including: a sensor including a sensing electrode for sensing a touch input and a pen sensing electrode for sensing a pen input; and a sensor controller configured to acquire a first coordinate based on a touch sensing signal received from the sensing electrode and acquire a second coordinate based on a pen sensing signal received from the pen sensing electrode during a first sensing frame, wherein the first sensing frame includes a first blank period, a touch sensing period for sensing the touch input, and a pen sensing period for sensing the pen input, wherein the first blank period, the touch sensing period, and the pen sensing period are sequentially arranged, and wherein a duration of the first blank period and a duration of the pen sensing period are adjustable.

21 Claims, 16 Drawing Sheets

(56) References Cited

U.S. PATENT DOCUMENTS

| | | | |
|---|---|---|---|
| 2015/0123940 A1* | 5/2015 | Park | G06F 3/0441 |
| | | | 345/174 |
| 2016/0370915 A1* | 12/2016 | Agarwal | G06F 3/0443 |
| 2018/0059868 A1* | 3/2018 | Brahma | G09G 3/2022 |
| 2018/0113549 A1* | 4/2018 | Park | G06F 3/03545 |
| 2018/0120962 A1* | 5/2018 | Hara | G06F 3/04162 |
| 2019/0102010 A1* | 4/2019 | Knabenshue | G06F 3/0442 |
| 2019/0114980 A1* | 4/2019 | Kim | G02F 1/136213 |
| 2019/0384452 A1* | 12/2019 | Kang | G06F 3/04184 |
| 2020/0026383 A1* | 1/2020 | Hwang | G06F 3/04184 |
| 2020/0201480 A1* | 6/2020 | Choi | G06F 3/04162 |
| 2020/0363906 A1* | 11/2020 | Kono | G06F 3/0448 |
| 2022/0019331 A1* | 1/2022 | Park | G06F 3/04184 |
| 2022/0100340 A1 | 3/2022 | Oh et al. | |
| 2022/0187938 A1* | 6/2022 | Han | G06F 3/0446 |
| 2023/0244340 A1* | 8/2023 | Fu | G06F 3/0446 |
| | | | 345/173 |

FOREIGN PATENT DOCUMENTS

| | | |
|---|---|---|
| KR | 10-2018-0012482 | 2/2018 |
| KR | 10-2324210 | 11/2021 |
| KR | 10-2022-0043964 | 4/2022 |
| KR | 10-2022-0118534 | 8/2022 |

\* cited by examiner

INPUT SENSOR AND A DISPLAY DEVICE FOR SENSING A TOUCH INPUT AND A PEN INPUT

CROSS-REFERENCE TO RELATED APPLICATION

This application claims priority under 35 U.S.C. § 119 to Korean Patent Application No. 10-2022-0166963 filed on Dec. 2, 2022, in the Korean Intellectual Property Office, the disclosure of which is incorporated by reference herein in its entirety.

TECHNICAL FIELD

Embodiments of the present disclosure described herein relate to a display device, and more particularly, to a display device including an input sensor for sensing a touch input and a pen input.

DISCUSSION OF RELATED ART

Multimedia electronic devices, including TVs, mobile phones, tablet personal computers (PCs), navigation systems, game consoles, and the like, commonly include a display device that displays an image. In recent times, there has been a growing demand for display devices that offer touch-based input capabilities, enabling users to easily and intuitively input information or commands.

In addition, there is a growing demand for incorporating a pen as an input tool for users who are accustomed to using writing instruments or for specific applications like sketching or drawing. Accordingly, the input sensor utilized in the display device is required to sense various inputs, including electronic pen input, touch input from a user's body, or input based on pressure.

SUMMARY

Embodiments of the present disclosure provide an input sensor and a display device capable of sensing a touch input and a pen input.

According to an embodiment of the present disclosure, there is provided an input sensor including: a sensor including a sensing electrode for sensing a touch input and a pen sensing electrode for sensing a pen input; and a sensor controller configured to acquire a first coordinate based on a touch sensing signal received from the sensing electrode and acquire a second coordinate based on a pen sensing signal received from the pen sensing electrode during a first sensing frame, wherein the first sensing frame includes a first blank period, a touch sensing period for sensing the touch input, and a pen sensing period for sensing the pen input, wherein the first blank period, the touch sensing period, and the pen sensing period are sequentially arranged, and wherein a duration of the first blank period and a duration of the pen sensing period are adjustable.

The touch sensing period and the pen sensing period do not overlap each other during the first sensing frame.

The first blank period is a period between a beginning of the first sensing frame and the touch sensing period.

The first sensing frame further includes a second blank period between the touch sensing period and the pen sensing period, and a duration of the second blank period is adjustable.

The first sensing frame includes another touch sensing period.

The first sensing frame includes another pen sensing period.

The duration of the first blank period is decreased when the duration of the pen sensing period increases.

The sensor controller is configured to acquire the first coordinate and the second coordinate during a second sensing frame consecutive to the first sensing frame, the second sensing frame includes the first blank period, the touch sensing period, and the pen sensing period, and a duration of the first blank period of the second sensing frame is adjustable.

The durations of the first blank periods of the first and second sensing frames are different from each other, and the durations of the pen sensing periods of the first and second sensing frames are different from each other.

The sensor controller is configured to repeat the first and second sensing frames.

The sensing electrode includes a first sensing electrode and a second sensing electrode insulated from and crossing the first sensing electrode, the pen sensing electrode includes: a 1-1-th pen sensing electrode adjacent to the first sensing electrode and insulated from and crossing the second sensing electrode; a 2-1-th pen sensing electrode adjacent to the second sensing electrode and insulated from and crossing the first sensing electrode and the 1-1-th pen sensing electrode; and a 1-2-th pen sensing electrode disposed on a different layer from the first sensing electrode and the 1-1-th pen sensing electrode and overlapping a portion of the first sensing electrode on a plane.

The 1-2-th pen sensing electrode is electrically connected to the 1-1-th pen sensing electrode, and the 1-2-th pen sensing electrode overlaps a portion of the 1-1-th pen sensing electrode on the plane.

According to an embodiment of the present disclosure, there is provided a display device including: a display panel including a plurality of pixels; a sensor disposed on the display panel and including a sensing electrode for sensing a touch input and a pen sensing electrode for sensing a pen input; and a sensor controller configured to acquire a first coordinate based on a touch sensing signal received from the sensing electrode during a first sensing frame and acquire a second coordinate based on a pen sensing signal received from the pen sensing electrode during the first sensing frame, wherein the first sensing frame includes a first blank period, a touch sensing period for sensing the touch input, and a pen sensing period for sensing the pen input, wherein the first blank period, the touch sensing period, and the pen sensing period are sequentially arranged, and wherein a duration of the first blank period and a duration of the pen sensing period are adjustable.

The touch sensing period and the pen sensing period do not overlap each other during the first sensing frame.

The first blank period is a period between a beginning of the first sensing frame and the touch sensing period.

The first sensing frame further includes a second blank period between the touch sensing period and the pen sensing period, and a duration of the second blank period is adjustable.

The first sensing frame includes another touch sensing period.

The first sensing frame includes another pen sensing period.

The sensor controller is configured to acquire the first coordinate and the second coordinate during a second sensing frame consecutive to the first sensing frame, the second sensing frame includes the first blank period, the touch sensing period, and the pen sensing period, a duration of the first blank period of the second sensing frame is adjustable, and a driving frame for driving the pixels corresponds to the first sensing frame and the second sensing frame.

The sensing electrode includes a first sensing electrode and a second sensing electrode insulated from and crossing the first sensing electrode, the pen sensing electrode includes: a 1-1-th pen sensing electrode adjacent to the first sensing electrode and insulated from and crossing the second sensing electrode; a 2-1-th pen sensing electrode adjacent to the second sensing electrode and insulated from and crossing the first sensing electrode and the 1-1-th pen sensing electrode; and a 1-2-th pen sensing electrode disposed on a different layer from the first sensing electrode and the 1-1-th pen sensing electrode and overlapping a portion of the first sensing electrode on a plane, the 1-2-th pen sensing electrode is electrically connected to the 1-1-th pen sensing electrode, and the 1-2-th pen sensing electrode overlaps a portion of the 1-1-th pen sensing electrode on the plane.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
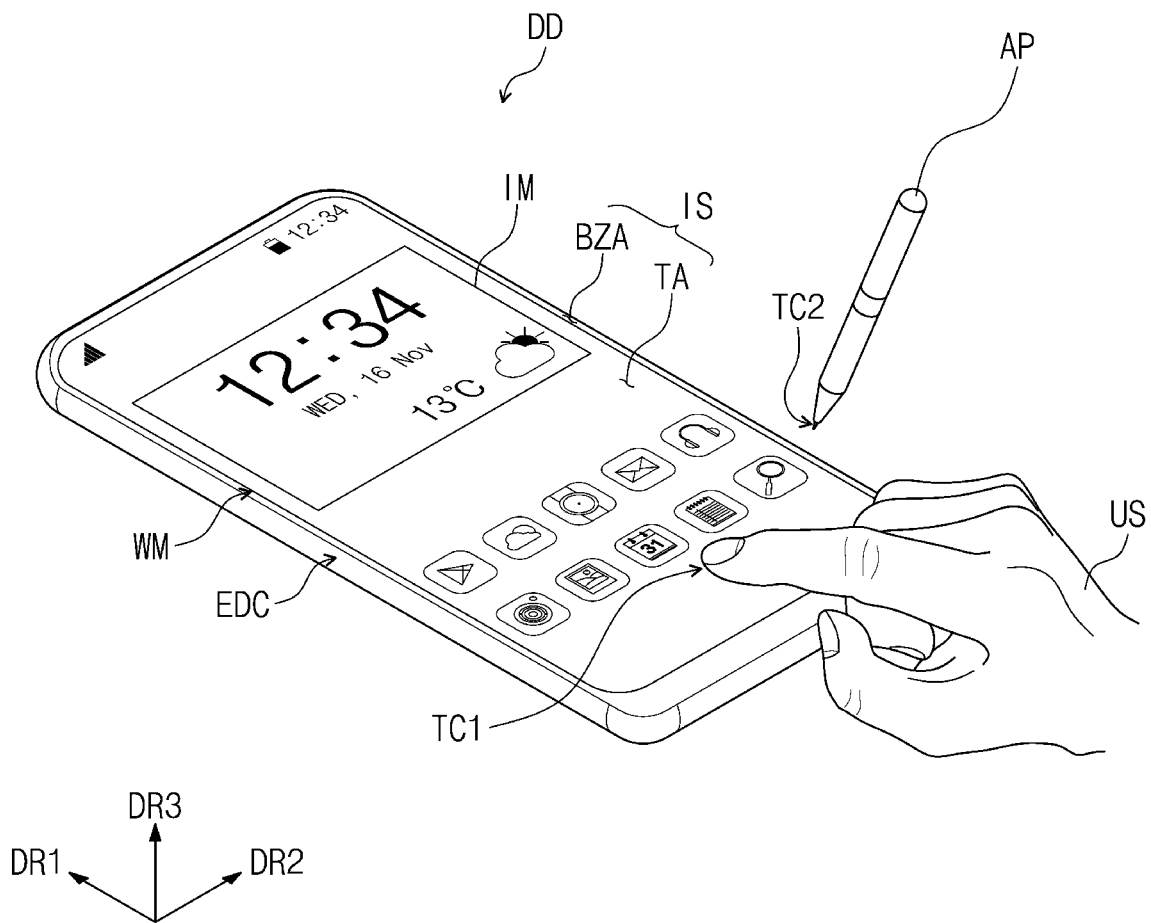
FIG. 1 is a perspective view illustrating a display device according to an embodiment of the present disclosure.

In the specification, the expression that a first component (or region, layer, part, etc.) is "on", "connected with", or "coupled with" a second component may mean that the first component is directly on, connected with, or coupled with the second component or may mean that a third component is interposed therebetween.

In the specification, the same reference numerals/signs may refer to the same components. In addition, in drawings, the thickness, ratio, and dimension of components may be exaggerated. The term "and/or" includes one or more combinations of the associated listed items.

The terms "first", "second", etc. are used to describe various components, but the components are not limited by these terms. These terms are used to differentiate one component from another component. For example, a first component may be referred to as a second component, and similarly, a second component may be referred to as a first component. As used herein, singular forms may include plural forms as well unless the context clearly indicates otherwise.

In addition, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
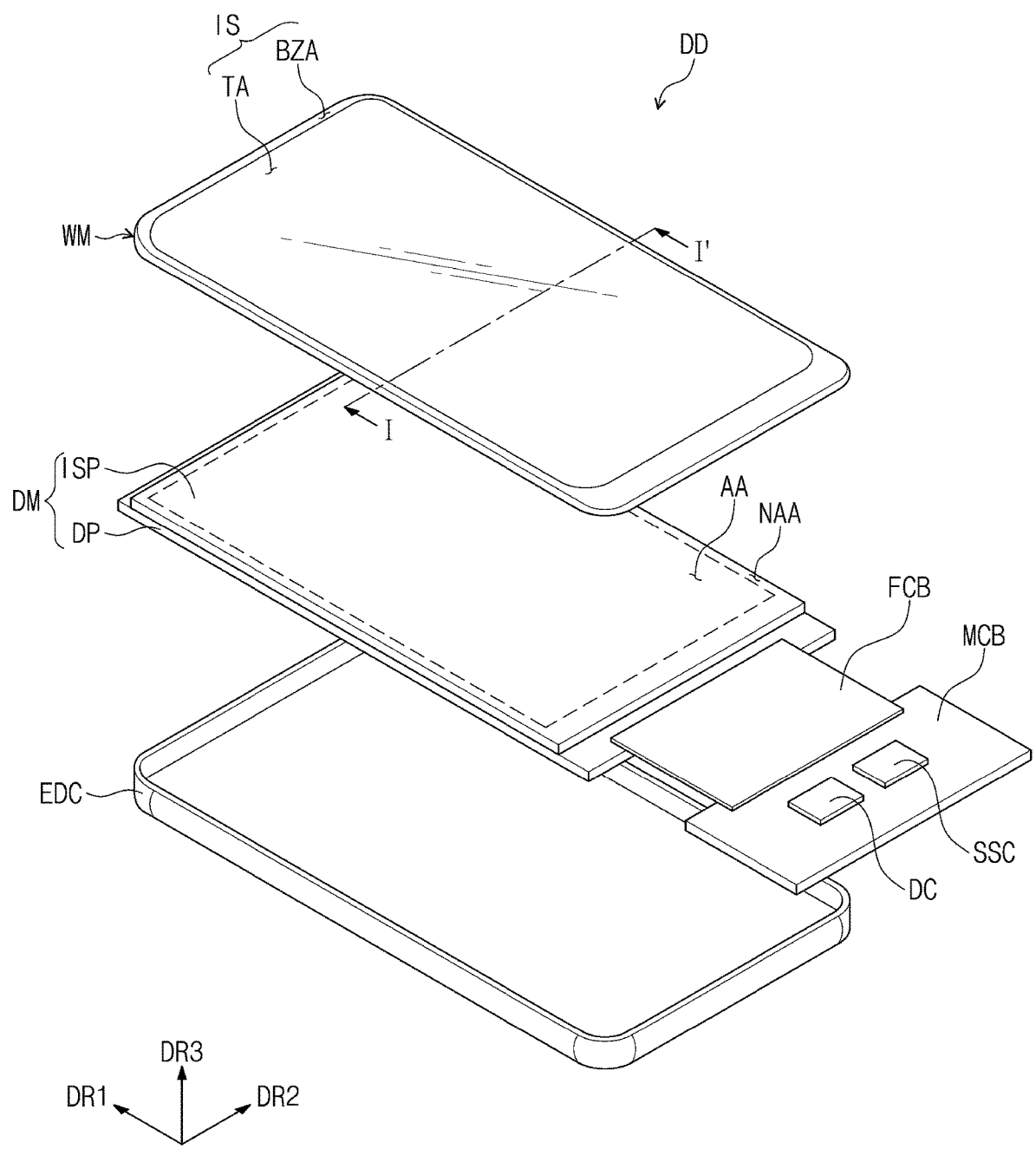
FIG. 2 is an exploded perspective view of a display device, according to an embodiment of the present disclosure.
Figure 3:
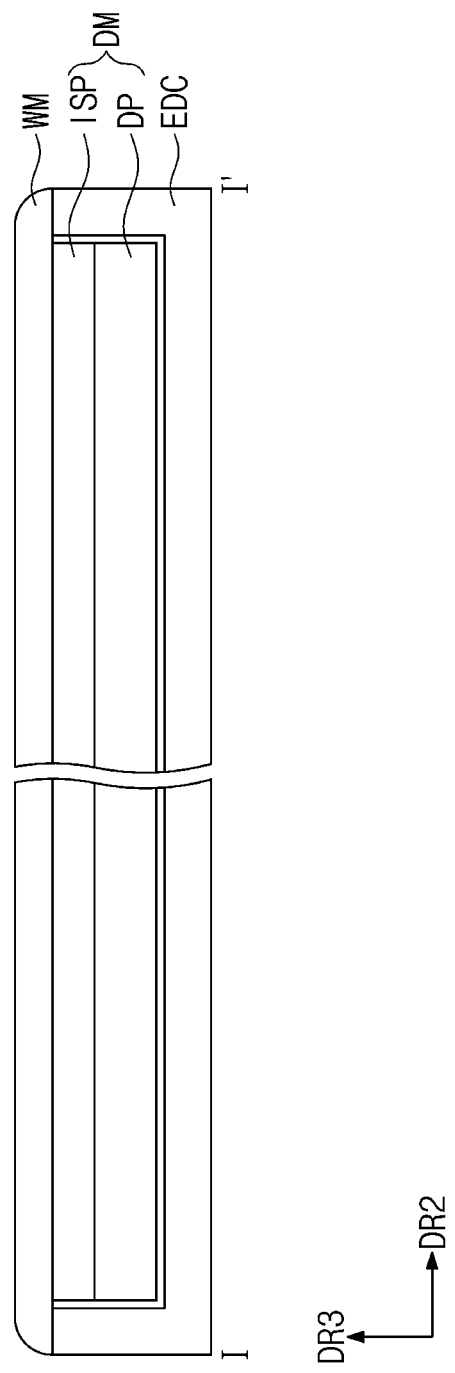
FIG. 3 is a cross-sectional view of an electronic device, according to an embodiment of the present disclosure.

FIG. 1 is a perspective view of a display device according to an embodiment of the present disclosure. FIG. 2 is an exploded perspective view of a display device, according to an embodiment of the present disclosure. FIG. 3 is a cross-sectional view of an electronic device, according to an embodiment of the present disclosure.

Referring to FIGS. 1 and 2, a display device DD may be a device that displays an image IM depending on an electrical signal. The display device DD may be applied to an electronic device such as a smart watch, a tablet PC, a notebook computer, a computer, or a smart television.

The display device DD may display the image IM on a display surface IS parallel to each of a first direction DR1 and a second direction DR2, thereby facing a third direction DR3. The display surface IS on which the image IM is displayed may correspond to a front surface of the display device DD. The image IM may include a moving image or a still image.

In the present embodiment, a front surface (or an upper/top surface) and a rear surface (or a lower/bottom surface) of each member are described with respect to a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense a first input TC1 of a user touch US that is applied from the outside. For example, the first input TC1 of the user touch US may be one of various types of external inputs, such as a part of a body of a user, a light, heat, and pressure, or a combination thereof. In this embodiment, the first input TC1 of the user touch US is described by taking, as an example, a touch input by a hand of the user, which is applied to a front surface, but the present disclosure is not limited thereto. As described above, the first input TC1 of the user touch US may be provided in various forms. In addition, the display device DD may sense the first input TC1 of the user touch US applied to a side surface or a rear surface of the display device DD depending on a structure of the display device DD, and thus, the display device DD is not limited to one embodiment for sensing.

In addition, the display device DD according to an embodiment of the present disclosure may sense a second input TC2 that is applied from the outside. The second input TC2 may include inputs by an input device AP (e.g., a stylus pen, an active pen, a touch pen, an electronic pen, an e-pen, or the like). In the following description, a case where the input device AP is referred to as the pen AP and the second input TC2 is a pen input by the pen AP will be described as an example.

The front surface of the display device DD may be divided into a transparent area TA and a bezel area BZA. The transparent area TA may be an area in which the image IM is displayed. A user may visually perceive the image IM through the transparent area TA. In this embodiment, the transparent area TA is illustrated in the shape of a quadrangle whose vertexes are rounded. However, this is illustrated as an example. The transparent area TA may have various shapes and may not be limited to any one embodiment.

The bezel area BZA is adjacent to the transparent area TA. The bezel area BZA may have a given color. The bezel area BZA may surround the transparent area TA. Accordingly, the shape of the transparent area TA may be defined substantially by the bezel area BZA. However, this is illustrated as an example. The bezel area BZA may be disposed adjacent to only one side of the transparent area TA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM includes a display panel DP and a sensor ISP.

The display panel DP according to an embodiment of the present disclosure may be a light-emitting display panel, but is not particularly limited thereto. For example, the display panel DP may be an organic light-emitting display panel or a quantum dot light-emitting display panel. An emission layer of the organic light-emitting display panel may include an organic light-emitting material. An emission layer of the quantum dot light-emitting display panel may include a quantum dot, a quantum rod, etc. Hereinafter, it is described that the display panel DP is an organic light-emitting display panel.

Although it is shown in FIGS. 1 and 2 that the display device DD has a flat structure, the present disclosure is not limited thereto. The display device DD may be bent or folded around a folding axis and may have a slidable structure.

Referring to FIG. 2, the sensor ISP may be directly disposed on the display panel DP. The sensor ISP may be smaller than the display panel DP. According to an embodiment of the present disclosure, the sensor ISP may be formed on the display panel DP by a consecutive process. In other words, when the sensor ISP is directly disposed on the display panel DP, an adhesive film may not be disposed between the sensor ISP and the display panel DP.

The display panel DP may output the image IM, and the sensor ISP may detect an external input (e.g., the first input TC1 and the second input TC2).

The window WM may be formed of a transparent material capable of outputting the image IM. For example, the window WM may be formed of glass, sapphire, plastic, or the like. An example in which the window WM is implemented with a single layer is illustrated, but the present disclosure is not limited thereto. For example, the window WM may include a plurality of layers.

An anti-reflective layer may be further interposed between the window WM and the display module DM. The anti-reflection layer decreases reflectance of an external light incident from above the window WM. The anti-reflection layer according to an embodiment of the present disclosure may include a retarder and a polarizer. The retarder may be of a film type or a liquid crystal coating type. The polarizer may also be of a film type or a liquid crystal coating type. The film type may include a stretch-type synthetic resin film, and the liquid crystal coating type may include liquid crystals arranged in a given direction. The retarder and the polarizer may be implemented with one polarization film.

The display module DM may display an image depending on an electrical signal and may transmit/receive information about an external input. The display module DM may include an active area AA and a peripheral area NAA. The active area AA may be an area through which an image provided from the display module DM is output.

The peripheral area NAA may be adjacent to the active area AA. For example, the peripheral area NAA may surround the active area AA. However, this is illustrated as an example. For example, the peripheral area NAA may have various shapes, and not limited to any one embodiment. According to an embodiment, the active area AA of the display module DM may correspond to at least a portion of the transparent area TA.

The sensor ISP may be electrically connected with a main circuit board MCB through a flexible circuit film FCB. However, an embodiment of the present disclosure is not limited thereto. In other words, the display module DM may additionally include a separate flexible circuit film for electrically connecting the sensor ISP and the main circuit board MCB.

The display device DD may further include the main circuit board MCB, the flexible circuit film FCB, a driving controller DC, and a sensor controller SSC. The main circuit board MCB may be connected with the flexible circuit film FCB and electrically connected with the display panel DP. The main circuit board MCB may include a plurality of driving elements. The plurality of driving elements may include a circuit unit for driving the display panel DP. The flexible circuit film FCB may be connected with the display panel DP to electrically connect the display panel DP and the main circuit board MCB. The driving controller DC and the sensor controller SSC may be mounted on the main circuit board MCB, but the present disclosure is not limited thereto. In one embodiment, the driving controller DC and the sensor controller SSC may be mounted on the flexible circuit film FCB. In another embodiment, the driving controller DC and the sensor controller SSC may be mounted in the peripheral area NAA of the display panel DP. In this case, signals from the driving controller DC and the sensor controller SSC may not pass through the flexible circuit film FCB. Furthermore, the flexible circuit film FCB and the main circuit board MCB may not be required.

In one embodiment, the driving controller DC may be implemented as an integrated circuit IC. In one embodiment, the sensor controller SSC may be implemented as an integrated circuit IC.

Although the driving controller DC and the sensor controller SSC are illustrated in FIG. 2 as being implemented as independent circuits, the present disclosure is not limited thereto. In one embodiment, the driving controller DC and the sensor controller SSC may be implemented as a single circuit. For example, the sensor controller SSC may be included in the driving controller DC.

The driving controller DC may provide signals for driving pixels of the display panel DP. The sensor controller SSC may receive a sensing signal from the sensor ISP and acquire coordinate information of each of the first input TC1 and the second input TC2 based on the sensing signal.

Referring back to FIG. 2, the display device DD may further include an outer case EDC accommodating the display module DM. The outer case EDC may be coupled to the window WM to define the exterior of the display device DD. The outer case EDC may absorb external shocks and may prevent a foreign material/moisture or the like from being infiltrated into the display module DM. This way, components accommodated in the outer case EDC are protected. As an example of the present disclosure, the outer case EDC may be provided in the form of a combination of a plurality of accommodating members.

The display device DD according to an embodiment may further include an electronic module including various functional modules for operating the display module DM, a power supply module for supplying a power necessary for overall operations of the display device DD, a bracket coupled with the display module DM and/or the outer case EDC to partition an inner space of the display device DD, etc.

Figure 4:
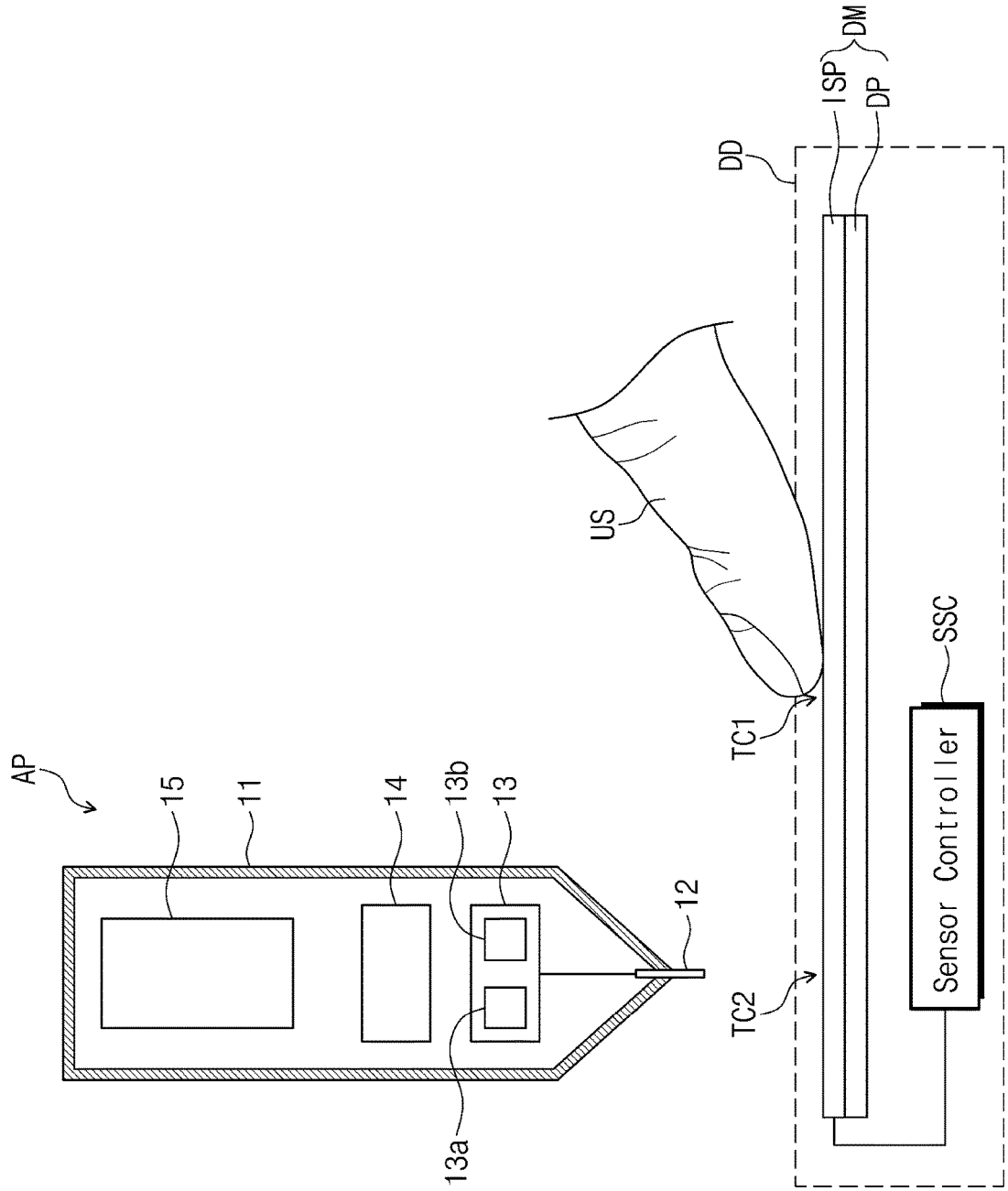
FIG. 4 is a block diagram for describing an operation of a display device according to an embodiment of the present disclosure.

FIG. 4 is a block diagram describing an operation of a display device according to an embodiment of the present disclosure.

Referring to FIG. 4, the display device DD according to an embodiment of the present disclosure may further include the sensor controller SSC connected to the sensor ISP. The sensor controller SSC may control driving of the sensor ISP. In addition, the sensor controller SSC may acquire a first coordinate corresponding to the first input TC1 and acquire a second coordinate corresponding to the second input TC2, based on the sensing signal received from the sensor ISP. In one embodiment, the sensor ISP and the sensor controller SSC may constitute an input sensor for sensing the first input TC1 and the second input TC2.

The sensor ISP may include a sensing electrode for sensing a touch input and a pen sensing electrode for sensing a pen input. The structure and operation of the sensor ISP will be described in detail below with reference to drawings.

The sensor controller SSC may be connected to sensing electrodes of the sensor ISP. The sensor controller SSC may drive the sensor ISP to sequentially sense the first input TC1 and the second input TC2 within a single frame. According to an embodiment of the present disclosure, not only the first input TC1, in other words, the user touch US but also the second input TC2, in other words, a pen input by the pen AP may be sensed by the sensor controller SSC implemented as one integrated circuit.

As shown in FIG. 4, the pen AP may include a housing 11, a conductive tip 12, and a communication module 13. The housing 11 may have a pen shape, and include an accommodation space formed therein. The conductive tip 12 may protrude outward from one open side of the housing 11. The conductive tip 12 may be a portion of the pen AP that directly contacts the sensor ISP.

The communication module 13 may include a transmitting circuit 13a and a receiving circuit 13b. The transmitting circuit 13a may transmit a downlink signal to the sensor controller SSC. The downlink signal may include pen data, location information of the pen AP, an inclination of the pen AP, state information, and the like. The sensor controller SSC may receive a downlink signal through the sensor ISP when the pen AP comes into contact with the sensor ISP.

The receiving circuit 13b may receive an uplink signal from the sensor controller SSC. The uplink signal may include a beacon signal, panel information, information on a protocol version, or the like. The sensor controller SSC may supply an uplink signal to a plurality of electrodes to detect the approach of the pen AP. When the pen AP approaches the display device DD, the pen AP may receive an uplink signal through the plurality of electrodes. For example, the pen AP may receive an uplink signal through the pen electrode.

The pen AP may further include an input controller 14. The input controller 14 may be configured to control an operation of the pen AP according to a predefined program. The transmitting circuit 13a may receive a signal supplied from the input controller 14 and modulate the signal into a signal that is detectable by the sensor ISP, and the receiving circuit 13b may modulate a signal received through the sensing electrode of the sensor ISP into a signal that is processable by the input controller 14.

The pen AP may further include a power module 15 that supplies power.

Figure 5:
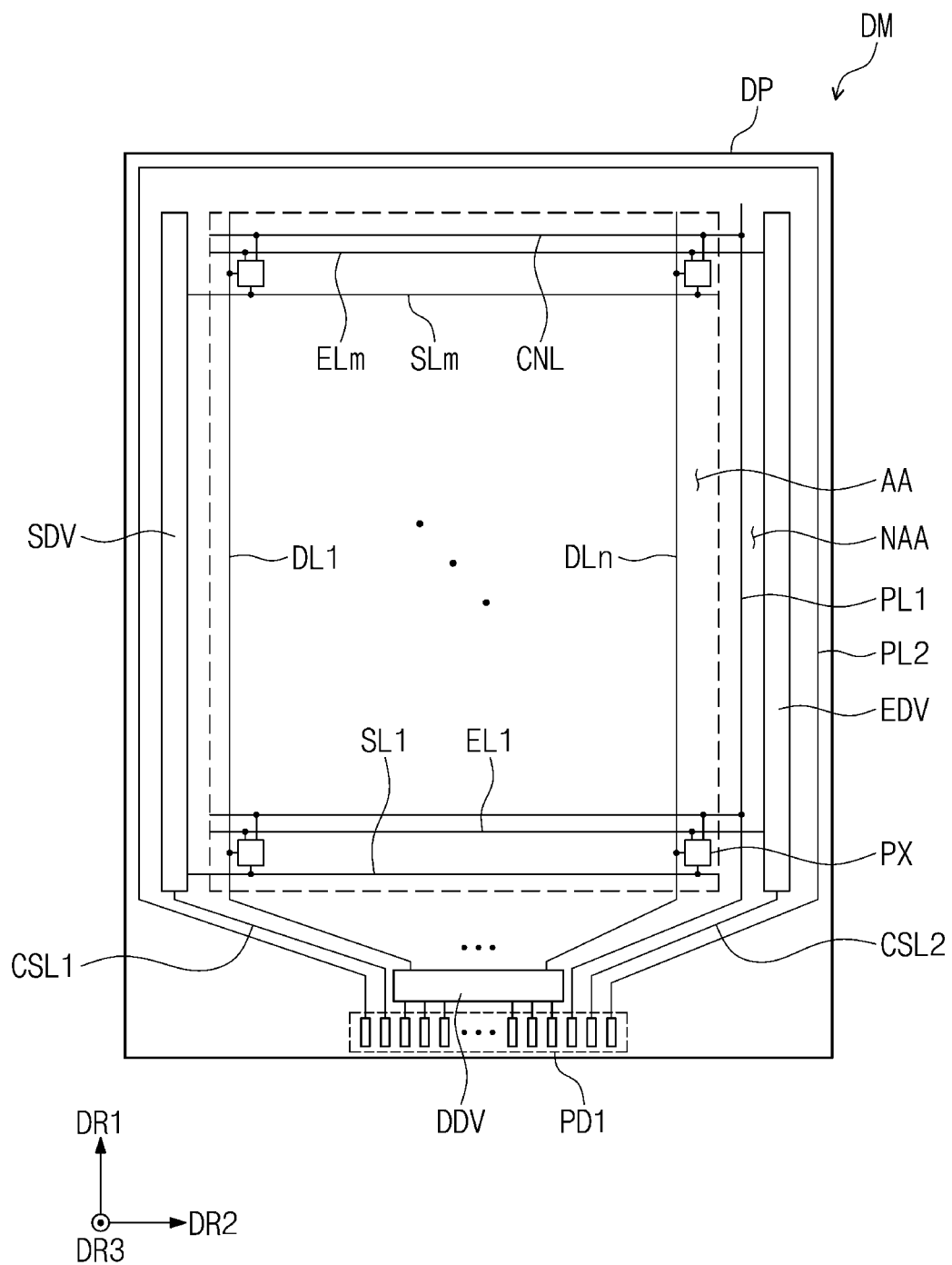
FIG. 5 is a plan view of a display panel, according to an embodiment of the present disclosure.

FIG. 5 is a plan view of the display panel DP according to an embodiment of the present disclosure.

Referring to FIG. 5, the display module DM may include the display panel DP, a scan driver SDV, a data driver DDV, an emission driver EDV, and a plurality of first pads PD1.

The display panel DP may have a rectangular shape having long sides extending in the first direction DR1 and short sides extending in the second direction DR2. However, the shape of the display panel DP is not limited thereto. The display panel DP may include the active area AA and the peripheral area NAA surrounding the active area AA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, and connecting lines CNL. Herein, "m" and "n" are natural numbers.

The pixels PX may be arranged in the active area AA. The scan driver SDV and the emission driver EDV may be disposed in the peripheral areas NAA respectively adjacent to the long sides of the display panel DP. The data driver DDV may be disposed in the peripheral area NAA adjacent to one of the short sides of the display panel DP. When viewed from a plan view, the data driver DDV may be adjacent to a lower end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the emission driver EDV.

The first power line PL1 may extend in the first direction DR1 and may be disposed in the peripheral area NAA. The first power line PL1 may be disposed between the active area AA and the emission driver EDV.

The connecting lines CNL may extend in the second direction DR2 and be arranged in the first direction DR1 to be connected to the first power line PL1 and the pixels PX. The first voltage may be applied to the pixels PX through the first power line PL1 and the connecting lines CNL that are connected to each other.

The second power line PL2 may be disposed in the peripheral area NAA and may extend along the long sides of the display panel DP and the other short side of the display panel DP at which the data driver DDV is not disposed. The second power line PL2 may be placed in the outer area away from the scan driver SDV and the emission driver EDV. For example, the second power line PL2 may be disposed closer to an edge of the display panel DP than the scan driver SDV, and the emission driver EDV may be located between the second power line PL2 and the first power line PL1.

The second power line PL2 may extend toward the active area AA to be connected to the pixels PX. A second voltage having a level lower than a first voltage may be applied to the pixels PX through the second power supply line PL2.

The first control line CSL1 may be connected to the scan driver SDV and may extend toward the lower end of the display panel DP. The second control line CSL2 may be connected to the emission driver EDV and may extend toward the lower end of the display panel DP. The data driver DDV may be disposed between the first control line CSL1 and the second control line CSL2.

The first pads PD1 may be disposed in the peripheral area NAA adjacent to the lower end of the display panel DP and may be closer to the lower end of the display panel DP than the data driver DDV. The data driver DDV, the first power supply line PL1, the second power supply line PL2, the first control line CSL1, and the second control line CSL2 may be connected to the first pads PD1. The data lines DL1 to DLn may be connected with the data driver DDV, and the data driver DDV may be connected with the first pads PD1 corresponding to the data lines DL1 to DLn.

The display device DD may further include a timing controller for controlling operations of the scan driver SDV the data driver DDV, and the emission driver EDV, and a voltage generator for generating first and second voltages. The timing controller and the voltage generator may be connected with the first pads PD1 through a printed circuit board.

The scan driver SDV may generate a plurality of scan signals, and the scan signals may be applied to the pixels PX through the scan lines SL1 to SLm. The data driver DDV may generate a plurality of data voltages. The data voltages may be applied to the pixels PX through the data lines DL1 to DLn. The emission driver EDV may generate a plurality of emission signals, and the emission signals may be applied to the pixels PX through the emission lines EL1 to ELm.

The pixels PX may receive the data voltages in response to the scan signals. The pixels PX may display images by emitting a light of luminance corresponding to the data voltages in response to the emission signals.

Figure 6:
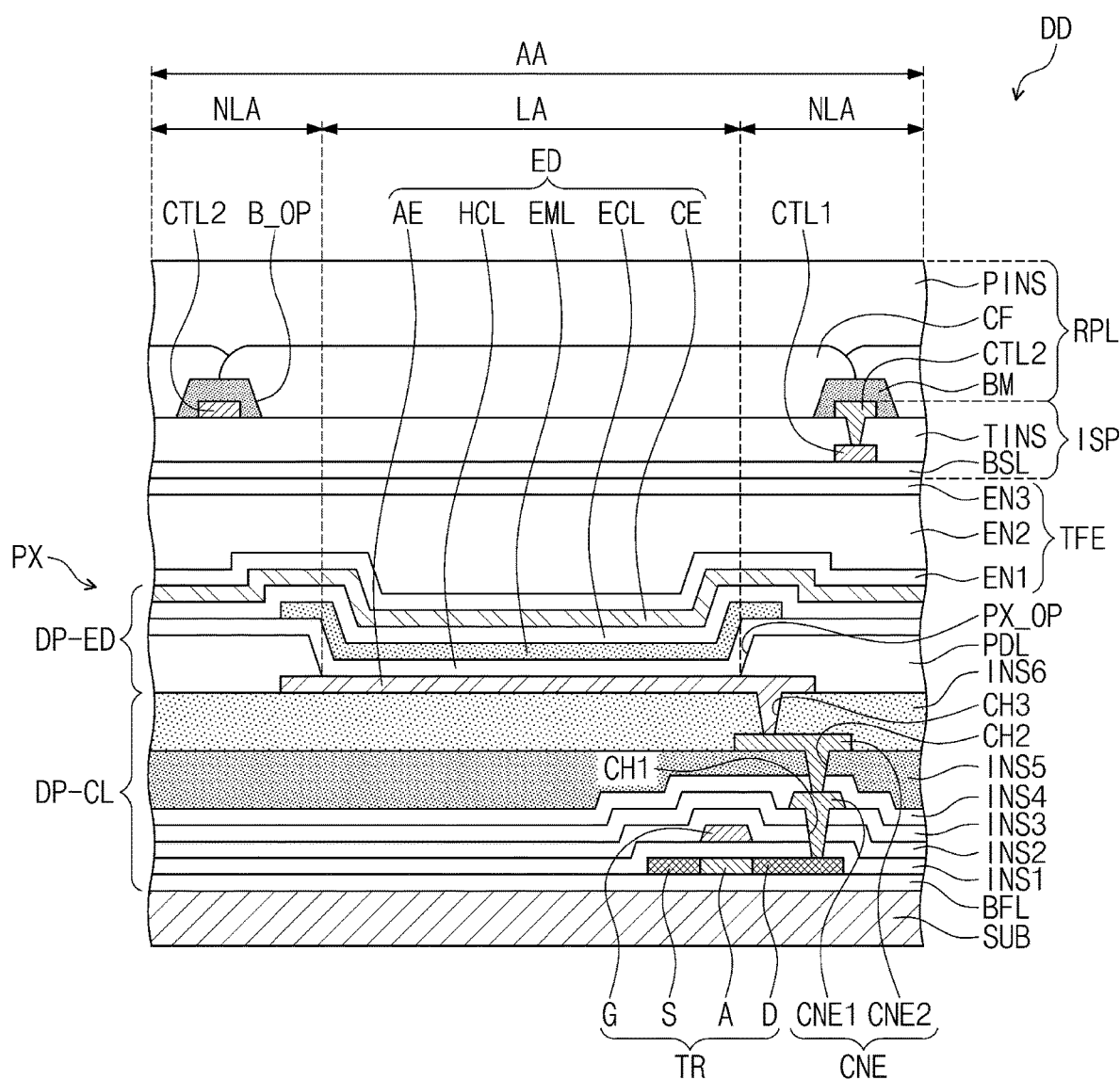
FIG. 6 is a diagram showing an example of a cross section of a display device.

FIG. 6 is a diagram showing an example of a cross section of a display device DD.

FIG. 6 shows a portion of a pixel shown in FIG. 5.

Referring to FIG. 6, the pixel PX may include a transistor TR and a light-emitting element ED. The light-emitting element ED may include a first electrode (or an anode) AE, a second electrode (or a cathode) CE, a hole control layer HCL, an electron control layer ECL, and an emissive layer EML.

The transistor TR and the light-emitting element ED may be disposed on a substrate SUB. In the present embodiment, one transistor TR is illustrated. However, in another embodiment, the pixel PX may include a plurality of transistors for driving the light-emitting element ED and at least one capacitor.

The active area AA may include an emission area LA corresponding to each of the pixels PX and a non-emissive area NLA around the emission area LA. The light-emitting element ED may be disposed in the emission area LA.

A buffer layer BFL may be disposed on the substrate SUB, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly doped area and a lightly doped area. Conductivity of the highly doped area may be greater than that of the lightly doped area. The highly doped area may serve as a source electrode or a drain electrode of the transistor TR. The lightly doped area may serve as an active (or channel) of the transistor TR.

A source S, an active A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may include a first connection electrode CNE1 and a second connection electrode CNE2 for connecting the transistor TR and the light-emitting element ED. The first connection electrode CNE1 may be disposed on the third insulating layer INS3 and may be connected to the drain D through a first contact hole CH1 formed in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 formed in the fourth and fifth insulating layers INS4 and INS5. In this case, a portion of the second connection electrode CNE2 may pass through the fourth and fifth insulating layers INS4 and INS5.

A sixth insulating layer INS6 may be disposed on the second connection electrode CNE2. Layers from the buffer layer BFL to the sixth insulating layer INS6 may be referred to as a circuit element layer DP-CL. The first to sixth insulating layers INS1 to INS6 may be inorganic layers or organic layers.

The first electrode AE may be disposed on the sixth insulating layer INS6. The first electrode AE may be connected to the second connection electrode CNE2 through a third contact hole CH3 formed in the sixth insulating layer INS6. A pixel defining layer PDL in which an opening PX_OP for exposing a given portion of the first electrode AE is formed may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emissive layer EML may be disposed on the hole control layer HCL. The emissive layer EML may be disposed in an area corresponding to the opening PX_OP. The emissive layer EML may include an organic material and/or an inorganic material. The emissive layer EML may generate a light with one of a red color, a green color, and a blue color.

The electron control layer ECL may be disposed on the emissive layer EML and the hole control layer HCL. The electron control layer ECL may include an electron transport layer and an electron injection layer. The hole control layer HCL and the electron control layer ECL may be disposed in common in the emission area LA and the non-emissive layer NLA.

The second electrode CE may be disposed on the electron control layer ECL. The second electrode CE may be disposed in the pixels PX in common. A layer in which the light-emitting element ED is disposed may be referred to as a display element layer DP-ED.

A thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic insulating layer, and may protect the pixel PX from moisture/oxygen. The second encapsulation layer EN2 includes an organic insulating layer and may protect the pixel PX from foreign objects such as dust particles.

A first voltage may be applied to the first electrode AE through the transistor TR, and a second voltage having a lower level than the first voltage may be applied to the second electrode CE. Excitons may be formed by coupling holes and electrons injected into the emissive layer EML. As the excitons transition to a ground state, the light-emitting element ED may emit light.

The sensor ISP may be disposed on the thin film encapsulation layer TFE. The sensor ISP may be directly fabricated on the upper surface of the thin film encapsulation layer TFE.

A base layer BSL may be disposed on the thin film encapsulation layer TFE. The base layer BSL may be part of the sensor ISP. The base layer BSL may include an inorganic insulating layer. At least one inorganic insulating layer may be provided on the thin film encapsulation layer TFE as the base layer BSL.

The sensor ISP may include a first conductive pattern CTL1 and a second conductive pattern CTL2 disposed on the first conductive pattern CTL1. The first conductive pattern CTL1 may be disposed on the base layer BSL. For example, the first conductive pattern CTL1 may be in direct contact with the base layer BSL. An insulating layer TINS may be disposed on the base layer BSL to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emissive area NLA. The first and second conductive patterns CTL1 and CTL2 may be disposed on the non-emissive area NLA between the emission areas LA and have a mesh shape.

The first and second conductive patterns CTL1 and CTL2 may form the aforementioned sensing electrodes and pen sensing electrodes of the sensor ISP. For example, the mesh-shaped first and second conductive patterns CTL1 and CTL2 may be separated from each other in a predetermined area to form the sensing electrodes and the pen sensing electrodes. A portion of the second conductive pattern CTL2 may be connected to the first conductive pattern CTL1.

An anti-reflection layer RPL may be disposed on the second conductive pattern CTL2. The anti-reflection layer RPL may include a black matrix BM and a plurality of color filters CF. The black matrix BM may overlap the non-emissive area NLA, and the color filters CF may overlap the emission areas LA, respectively.

The black matrix BM may be disposed on the insulating layer TINS to cover the second conductive pattern CTL2. An opening B_OP overlapping the emission area LA and the opening PX_OP may be formed in the black matrix BM. The black matrix BM may block light by absorbing light. The width of the opening B_OP may be greater than that of the opening PX_OP.

The color filters CF may be disposed on the insulating layer TINS and the black matrix BM. The color filters CF may be respectively disposed in the openings B_OP. A planarization insulating layer PINS may be disposed on the color filters CF. The planarization insulating layer PINS may provide a flat upper surface. The planarization insulating layer PINS may include an organic insulating layer.

When external light propagating toward the display panel DP is reflected by the display panel DP and provided back to an external user, the user may perceive the external light like a mirror. To prevent this phenomenon, the anti-reflection layer RPL may include the plurality of color filters CF representing the same colors as the pixels PX of the display panel DP. The color filters CF may filter external light to have the same colors as the pixels PX. In this case, external light may not be perceived by the user.

Figure 7:
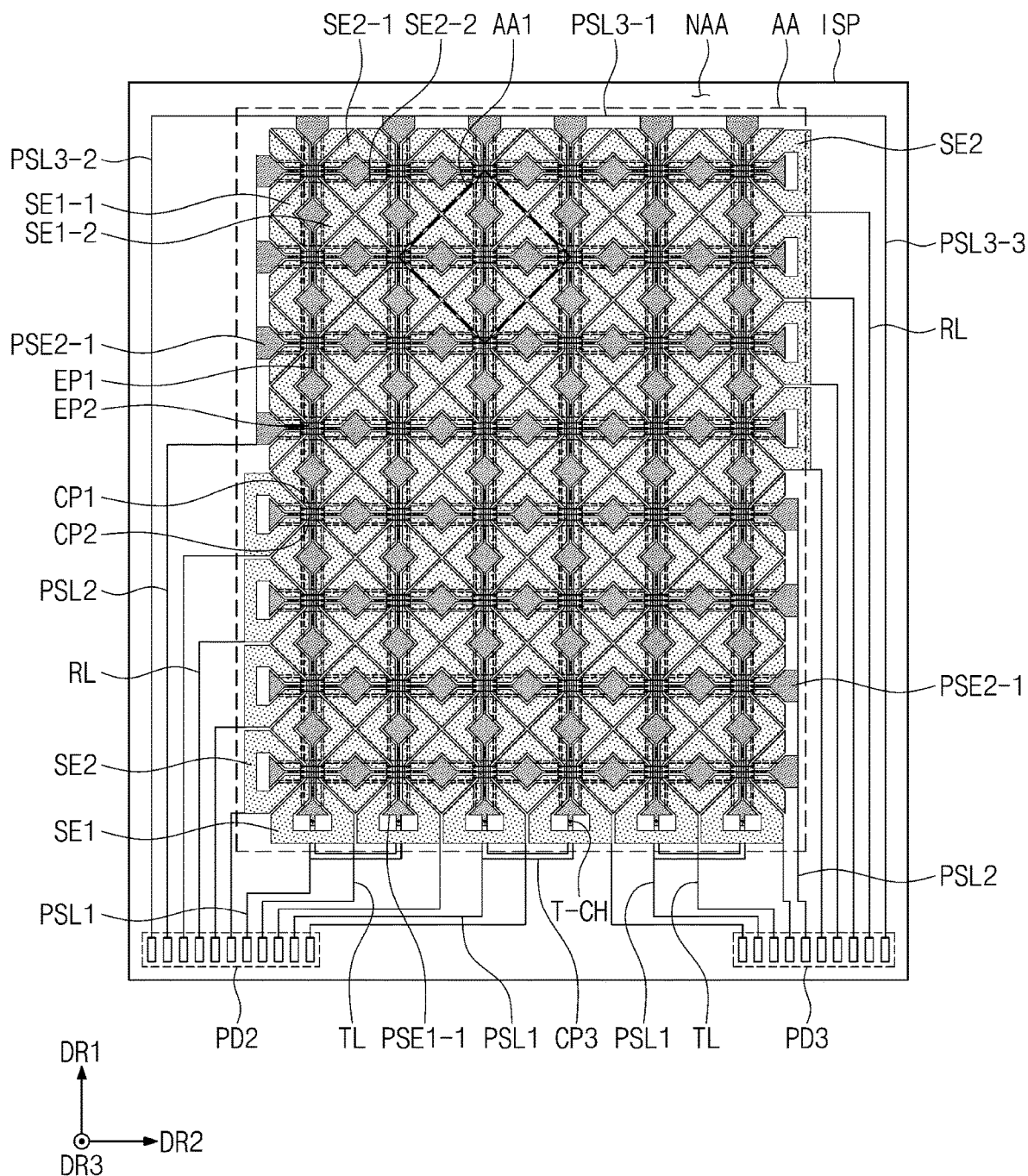
FIG. 7 is a plan view of a sensor according to an embodiment of the present disclosure.

FIG. 7 is a plan view of the sensor ISP according to an embodiment of the present disclosure.

Figure 8:
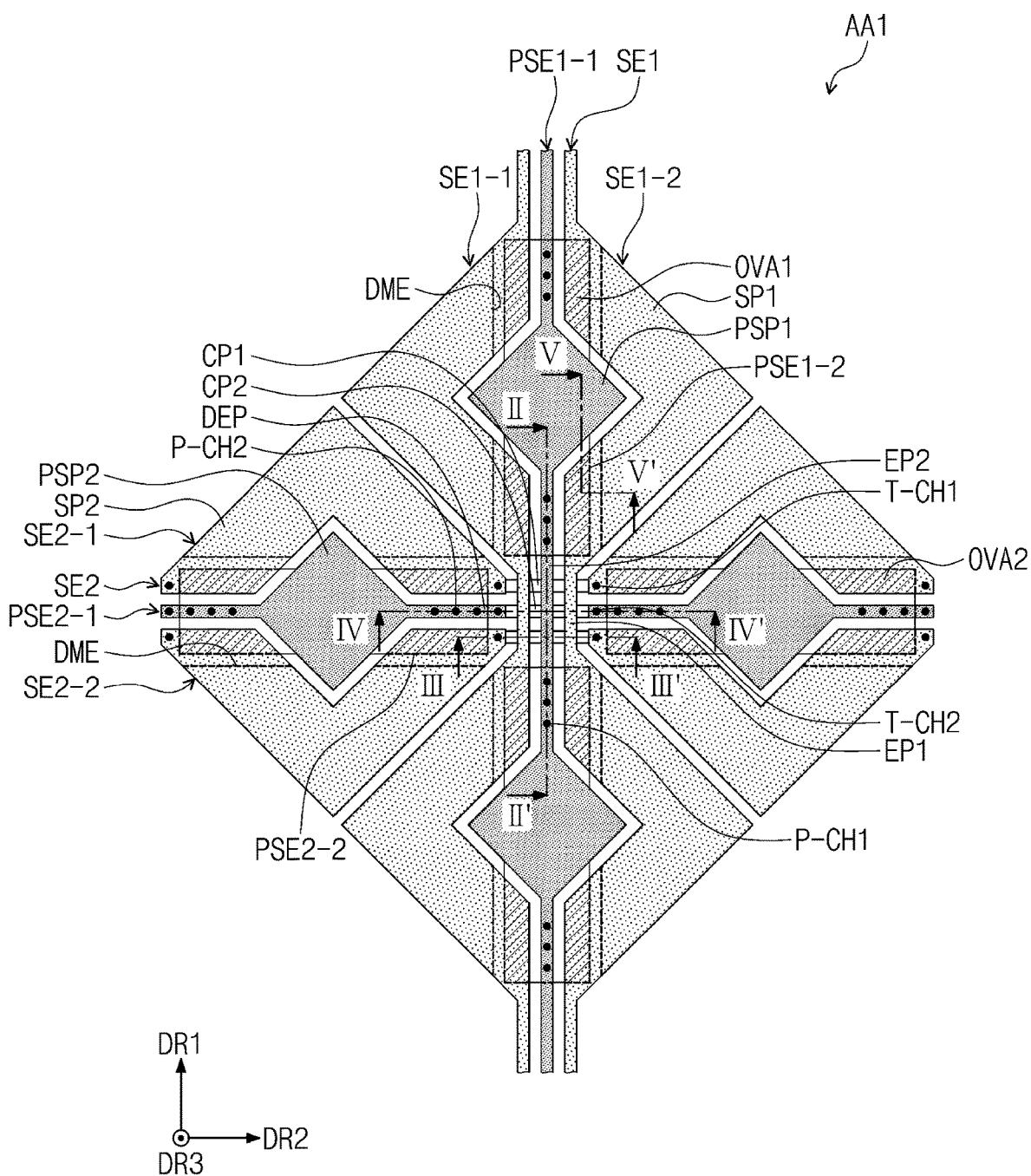
FIG. 8 is an enlarged view of a first area AA1 shown in FIG. 7.

FIG. 8 is an enlarged view of a first area AA1 shown in FIG. 7.

Figure 9:
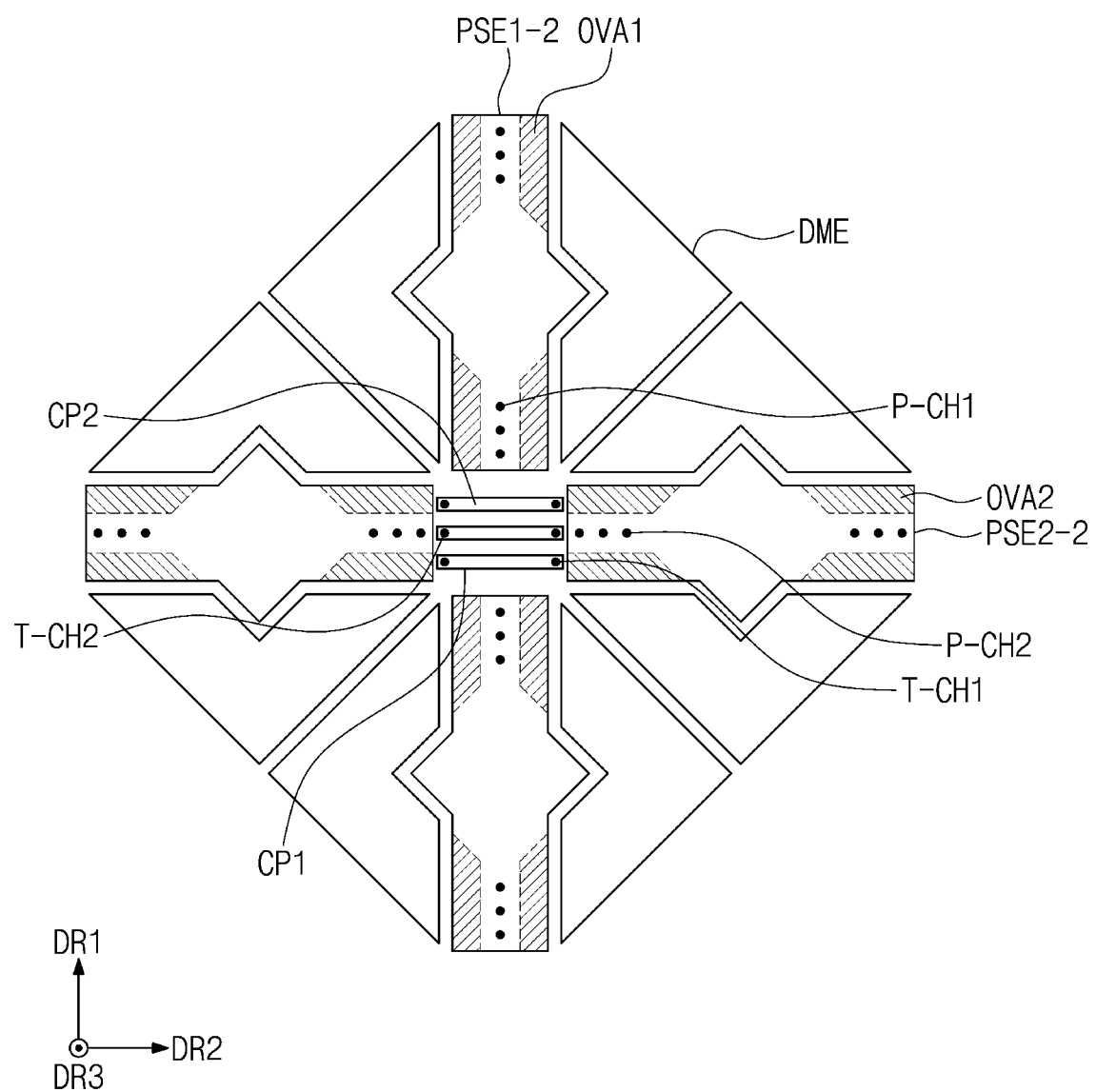
FIG. 9 is a diagram showing a 1-2-th pen sensing electrode, a 2-2-th pen sensing electrode, a dummy electrode, and first and second connection patterns shown in FIG. 8.

FIG. 9 is a diagram showing a 1-2-th pen sensing electrode PSE1-2, a 2-2-th pen sensing electrode PSE2-2, a dummy electrode DME, and first and second connection patterns CP1 and CP2 which are shown in FIG. 8.

Referring to FIG. 7, the sensor ISP may have a rectangular shape having long sides extending in the first direction DR1 and short sides extending in the second direction DR2 crossing the first direction DR1.

The sensor ISP may include a plurality of sensing electrodes SE1 and SE2, a plurality of sensing lines TL and RL, a plurality of 1-1-th and 2-1-th pen sensing electrodes PSE1-1 and PSE2-1, a plurality of pen sensing lines PSL1, PSL2, and PSL3-1, PSL3-2 and PSL3-3, and a plurality of second and third pads PD2 and PD3. The sensing electrodes SE1 and SE2, the sensing lines TL and RL, the 1-1-th and 2-1-th pen sensing electrodes PSE1-1 and PSE2-1, the pen sensing lines PSL1, PSL2, and PSL3-1 to PSL3-3 and the second and third pads PD2 and PD3 may be disposed on the aforementioned thin film encapsulation layer TFE (see FIG. 6).

A planar area of the sensor ISP may include the active area AA and peripheral areas NAA around the active area AA.

The sensing electrodes SE1 and SE2 may be disposed in the active area AA, and the second and third pads PD2 and PD3 may be disposed in the peripheral areas NAA. The second pads PD2 and the third pads PD3 may be adjacent to a lower end of the sensor ISP when viewed from a plan view.

For example, the second pads PD2 may be disposed adjacent to the left side of the sensor ISP and the third pads PD3 may be disposed adjacent to the right side of the sensor ISP. When viewed from a plan view, the first pads PD1 shown in FIG. 5 may be disposed between the second pads PD2 and the third pads PD3.

The sensing electrodes SE1 and SE2 may include a plurality of first sensing electrodes SE1 extending in the first direction DR1 and arranged in the second direction DR2 and a plurality of second sensing electrodes SE2 extending in the second direction DR2 and arranged in the first direction DR1. The second sensing electrodes SE2 may extend to cross the first sensing electrodes SE1 while being insulated from the first sensing electrodes SE1. The first and second sensing electrodes SE1 and SE2 may be used to sense the aforementioned first input TC1 (see FIG. 4).

The sensing lines TL and RL may be connected to one ends of the first and second sensing electrodes SE1 and SE2 and extend to the peripheral areas NAA and be connected to the second and third pads PD2 and PD3. The sensing lines TL and RL may include a plurality of first sensing lines TL connected to the first sensing electrodes SE1 and a plurality of second sensing lines RL connected to the second sensing electrodes SE2.

For example, the first sensing lines TL may be disposed in the peripheral areas NAA adjacent to the lower side of the active area AA when viewed from a plan view. In addition, the second sensing lines RL may be disposed in the peripheral areas NAA adjacent to the left and right sides of the active area AA when viewed from a plan view. In a plan view, the first sensing lines TL may be disposed between the second sensing lines RL of the left and right sides of the active AA.

The first sensing lines TL may be connected to lower ends of the first sensing electrodes SE1. The first sensing lines TL may extend into the peripheral areas NAA and be connected to corresponding second and third pads PD2 and PD3.

The sensor ISP may be divided into a left portion and a right portion with respect to the center thereof in the second direction DR2. The first sensing lines TL connected to the first sensing electrodes SE1 disposed on the left portion may be connected to corresponding second pads PD2. The first sensing lines TL connected to the first sensing electrodes SE1 disposed on the right portion may be connected to corresponding third pads PD3.

The second sensing lines RL may be connected to left ends or right ends of the second sensing electrodes SE2. The second sensing lines RL may extend into the peripheral areas NAA and be connected to corresponding second and third pads PD2 and PD3.

The sensor ISP may be divided into an upper portion and a lower portion with respect to the center thereof in the first direction DR1. The second sensing lines RL disposed in the lower portion of the sensor ISP may be connected to left ends of the second sensing electrodes SE2 disposed in the lower portion of the sensor ISP. The right ends of the second sensing electrodes SE2 disposed in the lower portion of the sensor ISP may not be connected to the second sensing lines RL. The second sensing lines RL disposed in the upper portion of the sensor ISP may be connected to right ends of the second sensing electrodes SE2 disposed in the upper portion of the sensor ISP. The left ends of the second sensing electrodes SE2 disposed in the upper portion of the sensor ISP may not be connected to the second sensing lines RL.

The second sensing lines RL disposed in the lower portion of the sensor ISP may be disposed in the peripheral areas NAA adjacent to the left side of the active area AA. The second sensing lines RL disposed in the lower portion of the sensor ISP may extend toward the lower end of the sensor ISP and be connected to corresponding second pads PD2.

The second sensing lines RL disposed in the upper portion of the sensor ISP may be disposed in the peripheral areas NAA adjacent to the right side of the active area AA. The second sensing lines RL disposed in the upper portion of the sensor ISP may extend toward the lower end of the sensor ISP and be connected to the corresponding third pads PD3.

Each of the first sensing electrodes SE1 may include a 1-1-th sensing electrode SE1-1 and a 1-2-th sensing electrode SE1-2 extending in the first direction DR1 and spaced apart from each other in the second direction DR2. The 1-1-th sensing electrode SE1-1 and the 1-2-th sensing electrode SE1-2 may have shapes symmetrical to each other in the second direction DR2.

In each of the first sensing electrodes SE1, the lower end of the 1-1-th sensing electrode SE1-1 and the lower end of the 1-2-th sensing electrode SE1-2 may be integrally formed and be connected to a corresponding first sensing line TL among the first sensing lines TL. In each of the first sensing electrodes SE1, the upper end of the 1-1-th sensing electrode SE1-1 and the upper end of the 1-2-th sensing electrode SE1-2 may be separated from each other and not be connected.

Each of the second sensing electrodes SE2 may include a 2-1-th sensing electrode SE2-1 and a 2-2-th sensing electrode SE2-2 extending in the second direction DR2 and spaced apart from each other in the first direction DR1. The 2-1-th sensing electrode SE2-1 and the 2-2-th sensing electrode SE2-2 may have shapes symmetrical to each other in the first direction DR1.

In each of the second sensing electrodes SE2 disposed in the lower portion of the sensor ISP, the left end of the 2-1-th sensing electrode SE2-1 and the left end of the 2-2-th sensing electrode SE2-2 may be integrally formed and be connected to a corresponding second sensing line RL among the second sensing lines RL. In each of the second sensing electrodes SE2 disposed in the lower portion of the sensor ISP, the right end of the 2-1-th sensing electrode SE2-1 and the right end of the 2-2-th sensing electrode SE2-2 may be separated from each other and not be connected.

In each of the second sensing electrodes SE2 disposed in the upper portion of the sensor ISP, the right end of the 2-1-th sensing electrode SE2-1 and the right end of the 2-2-th sensing electrode SE2-2 may be integrally formed and be connected to a corresponding second sensing line RL among the second sensing lines RL. In each of the second sensing electrodes SE2 disposed in the upper portion of the sensor ISP, the left end of the 2-1-th sensing electrode SE2-1 and the left end of the 2-2-th sensing electrode SE2-2 may be separated from each other and not be connected.

The 1-1-th and 2-1-th pen sensing electrodes PSE1-1 and PSE2-1 may be disposed in the active area AA. The pen sensing lines PSL1, PSL2, and PSL3-1 to PSL3-3 may be connected to the 1-1-th and 2-1-th pen sensing electrodes PSE1-1 and PSE2-1 to extend into an inactive area, and may be connected to the corresponding second and third pads PD2 and PD3.

The sensor controller SSC (see FIG. 4) for controlling the sensor ISP may be connected to the second and third pads PD2 and PD3 through the flexible circuit film FCB.

The 1-1-th pen sensing electrodes PSE1-1 may extend in the first direction DR1 and be arranged in the second direction DR2. The plurality of 2-1-th pen sensing electrodes PSE2-1 may extend in the second direction DR2 and be arranged in the first direction DR1. The 1-1-th and 2-1-th pen sensing electrodes PSE1-1 and PSE2-1 may be used to sense the aforementioned second input TC2 (see FIG. 4).

The 1-1-th pen sensing electrodes PSE1-1 may be adjacent to the first sensing electrodes SE1, respectively. The 1-1-th pen sensing electrodes PSE1-1 may be insulated from and spaced apart from the first sensing electrodes SE1. The 2-1-th pen sensing electrodes PSE2-1 may be adjacent to the second sensing electrodes SE2, respectively. The 2-1-th pen sensing electrodes PSE2-1 may be insulated from and spaced apart from the second sensing electrodes SE2.

The 1-1-th pen sensing electrodes PSE1-1 may extend to cross the second sensing electrodes SE2 while being insulated from the second sensing electrodes SE2. The 2-1-th pen sensing electrodes PSE2-1 may extend to cross the 1-1-th pen sensing electrodes PSE1-1 while being insulated from the 1-1-th pen sensing electrodes PSE1-1. The 2-1-th pen sensing electrodes PSE2-1 may extend to cross the first sensing electrodes SE1 while being insulated from the first sensing electrodes SE1.

Each of the 1-1-th pen sensing electrodes PSE1-1 may be disposed between the 1-1-th sensing electrode SE1-1 and the 1-2-th sensing electrode SE1-2 in a corresponding first sensing electrode SE1 among the first sensing electrodes SE1. Each of the 2-1-th pen sensing electrodes PSE2-1 may be disposed between the 2-1-th sensing electrode SE2-1 and the 2-2-th sensing electrode SE2-2 in a corresponding second sensing electrode SE2 among the second sensing electrodes SE2.

The 1-1-th pen sensing electrodes PSE1-1 may be disposed on the same layer as the first sensing electrodes SE1. The 2-1-th pen sensing electrodes PSE2-1 may be disposed on the same layer as the second sensing electrodes SE2. Accordingly, the 1-1-th and 2-1-th pen sensing electrodes PSE1-1 and PSE2-1 may be disposed on the same layer as the first and second sensing electrodes SE1 and SE2.

The upper ends of the 1-1-th pen sensing electrodes PSE1-1 may be connected to each other. The lower ends of the 1-1-th pen sensing electrodes PSE1-1 may be connected to each other in pairs. The left ends of the 2-1-th pen sensing electrodes PSE2-1 disposed in the upper portion of the sensor ISP may be connected to each other. The right ends of the 2-1-th pen sensing electrodes PSE2-1 disposed in the lower portion of the sensor ISP may be connected to each other.

The right ends of the 2-1-th pen sensing electrodes PSE2-1 disposed in the upper portion of the sensor ISP may be separated from each other and not be connected. The left ends of the 2-1-th pen sensing electrodes PSE2-1 disposed in the lower portion of the sensor ISP may be separated from each other and not be connected.

The pen sensing lines PSL1, PSL2, and PSL3-1 to PSL3-3 may include a plurality of first pen sensing lines PSL1, a plurality of second pen sensing lines PSL2, and a plurality of 3-1-th, 3-2-th, and 3-3-th pen sensing lines PSL3-1, PSL3-2, and PSL3-3. The first pen sensing lines PSL1 and the 3-1-th, 3-2-th, and 3-3-th pen sensing lines PSL3-1, PSL3-2, and PSL3-3 may be connected to the 1-1-th pen sensing electrodes PSE1-1. The second pen sensing lines PSL2 may be connected to the 2-1-th pen sensing electrodes PSE2-1.

A pair of 1-1-th pen sensing electrodes PSE1-1 connected to each other at the lower ends thereof may be connected to a corresponding first pen sensing line PSL1 among the first pen sensing lines PSL1. The first pen sensing lines PSL1 may be located in a lower portion of the sensor ISP. The upper ends of the 1-1-th pen sensing electrodes PSE1-1 may be connected to the 3-1-th pen sensing line PSL3-1 extending in the second direction DR2. The 3-1-th pen sensing line PSL3-1 may be located in an upper portion of the sensor ISP.

The 3-2-th pen sensing line PSL3-2 and the 3-3-th pen sensing line PSL3-3 may extend from both ends of the 3-1-th pen sensing line PSL3-1 in the first direction DR1. The 3-2-th pen sensing line PSL3-2 may be disposed on the left side of the sensor ISP and may extend toward the lower end of the sensor ISP to be connected to the corresponding second pad PD2. The 3-3-th pen sensing line PSL3-3 may be disposed on the right side of the sensor ISP and may extend toward the lower end of the sensor ISP to be connected to the corresponding third pad PD3.

The left ends of the 2-1-th pen sensing electrodes PSE2-1 disposed in the upper portion of the sensor ISP may be connected to a corresponding second pen sensing line PSL2 among the second pen sensing lines PSL2. For example, four of the 2-1-th pen sensing electrodes PSE2-1 disposed in the upper portion of the sensor ISP may be connected to a single second pen sensing line PSL2. The second pen sensing line PSL2 connected to the 2-1-th pen sensing electrodes PSE2-1 disposed in the upper portion of the sensor ISP may be disposed on the left side of the sensor ISP to be connected to a corresponding second pad PD2.

The right ends of the 2-1-th pen sensing electrodes PSE2-1 disposed in the lower portion of the sensor ISP may be connected to a corresponding second pen sensing line PSL2 among the second pen sensing lines PSL2. For example, four of the 2-1-th pen sensing electrodes PSE2-1 disposed in the lower portion of the sensor ISP may be connected to a single second pen sensing line PSL2. The second pen sensing lines PSL2 connected to the 2-1-th pen sensing electrodes PSE2-1 disposed in the lower portion of the sensor ISP may be disposed on the right side of the sensor ISP to be connected to a corresponding third pad PD3.

In the present embodiment, the sensor ISP may be driven in a touch sensing period and a pen sensing period in a time division manner. The touch sensing period and the pen sensing period may be repeated. During the touch sensing period, the first and second sensing electrodes SE1 and SE2 may be driven to sense the touch by a user. During the pen sensing period, a touch by the pen AP may be sensed by the 1-1-th and 2-1-th pen sensing electrodes PSE1-1 and PSE2-1.

Because the touch by the user and the touch by the pen AP are performed through the same sensor ISP, two input devices such as a touch panel and a digitizer may not be used to reduce the thickness of the display device DD.

For example, six 1-1-th pen sensing electrodes PSE1-1 and eight 2-1-th pen sensing electrodes PSE2-1 are shown, but in practice, the sensor ISP may include more 1-1-th pen sensing electrodes PSE1-1 and more 2-1-th pen sensing electrodes PSE2-1.

Referring to FIGS. 7 and 8, each of the 1-1-th and 1-2-th sensing electrodes SE1-1 and SE1-2 may include a plurality of first sensing parts SP1 arranged in the first direction DR1 and a plurality of first extension patterns EP1 disposed between the first sensing parts SP1 and extending from the first sensing parts SP1 in the first direction DR1. The first extension patterns EP1 may have a line shape.

The first sensing parts SP1 may be bent. For example, the first sensing parts SP1 of the 1-1-th sensing electrode SE1-1 and the first sensing parts SP1 of the 1-2-th sensing electrode SE1-2 may be bent toward the outside. For example, the first sensing parts SP1 may have triangular shapes.

In each of the 1-1-th and 1-2-th sensing electrodes SE1-1 and SE1-2, the first extension patterns EP1 may be integrally formed with the first sensing parts SP1. Each of the first extension patterns EP1 may be arranged between the two first sensing parts SP1, which are adjacent to each other in the first direction DR1 and extend from the two first sensing parts SP1.

Each of the 2-1-th and 2-2-th sensing electrodes SE2-1 and SE2-2 may include a plurality of second sensing parts SP2 arranged in the second direction DR2 and a plurality of first connection patterns CP1 arranged between the second sensing parts SP2 and connecting the second sensing parts SP2. The first connection patterns CP1 may be adjacent to the first extension patterns EP1.

The sensing parts SP2 may be bent. For example, the second sensing parts SP2 of the 2-1-th sensing electrode SE2-1 and the second sensing parts SP2 of the 2-2-th sensing electrode SE2-2 may be bent toward the outside.

The first connection patterns CP1 may extend in the second direction DR2 and be connected to the second sensing parts SP2. The second sensing parts SP2 may be connected to each other through the first connection patterns CP1. When viewed from a plan view, the first connection patterns CP1 may cross the first extension patterns EP1. The first connection patterns CP1 may be insulated from the first extension patterns EP1.

Each of the first connection patterns CP1 may be disposed between two second sensing parts SP2 adjacent to each other in the second direction DR2 to connect the two second sensing parts SP2. An insulating layer may be disposed between the first connection patterns CP1 and the second sensing parts SP2, and the first connection patterns CP1 may be connected to the second sensing parts SP2 via first contact holes T-CH1 formed in the insulating layer. In FIG. 7, a contact hole is denoted as T-CH.

The first sensing parts SP1 and the second sensing parts SP2 may not overlap each other and may be spaced from each other; in this case, the first sensing parts SP1 and the second sensing parts SP2 may be alternately arranged. Capacitances may be formed by the first sensing parts SP1 and the second sensing parts SP2.

The first and second sensing parts SP1 and SP2 and the first extension patterns EP1 may be disposed on the same layer. The first connection patterns CP1 may be disposed on a different layer from the first and second sensing parts SP1 and SP2 and the first extension patterns EP1. The first connection patterns CP1 may be disposed below the first and second sensing parts SP1 and SP2 and the first extension patterns EP1.

Each of the pen sensing electrodes PSE1-1 may include a plurality of first pen sensing parts PSP1 arranged in the first direction DR1 and a plurality of second extension patterns EP2 extending from the first pen sensing parts PSP1 in the first direction DR1.

The first pen sensing parts PSP1 may have a diamond shape, but the shape of the first pen sensing parts PSP1 is not limited thereto. The second extension patterns EP2 may be integrally formed with the first pen sensing parts PSP1. The second extension patterns EP2 may have a line shape. Each of the second extension patterns EP2 may be arranged between two first pen sensing parts PSP1, which are adjacent to each other in the first direction DR1, and extend from the two first pen sensing parts PSP1.

Each of the pen sensing electrodes PSE2-1 may include a plurality of second pen sensing parts PSP2 arranged in the second direction DR2 and a plurality of second connection patterns CP2 connecting the second pen sensing parts PSP2.

The second pen sensing parts PSP2 may have a diamond shape, but the shape of the second pen sensing parts PSP2 is not limited thereto. The second connection patterns CP2 may extend in the second direction DR2 and may be disposed between the second pen sensing parts PSP2 and be connected to the second pen sensing parts PSP2. The second pen sensing parts PSP2 may be connected to each other through the second connection patterns CP2.

Each of the second connecting patterns CP2 may be disposed between the two second pen sensing parts PSP2, which are adjacent to each other in the second direction DR2, to connect the two second pen sensing parts PSP2. An insulating layer may be disposed between the second connection patterns CP2 and the second pen sensing parts PSP2, and the second connection patterns CP2 may be connected to the second pen sensing parts PSP2 via second contact holes T-CH2 formed in the insulating layer.

Each of the pen sensing electrodes PSE2-1 may include dummy extensions DEP extending from the second pen sensing parts PSP2 in the second direction. The dummy extensions DEP may extend from the tips of the diamond shaped second pen sensing parts PSP2. The second connection patterns CP2 may be connected to the dummy extensions DEP via the second contact holes T-CH2.

When viewed from a plan view, the first and second extension patterns EP1 and EP2 may extend to cross the first and second connection patterns CP1 and CP2. The first and second extension patterns EP1 and EP2 may be insulated from the first and second connection patterns CP1 and CP2.

The first pen sensing parts PSP1, the second pen sensing parts PSP2, and the second extension patterns EP2 may be disposed on the same layer as the first and second sensing parts SP1 and SP2 and the first extension patterns EP1. The second connection patterns CP2 may be disposed on the same layer as the first connection patterns CP1. Accordingly, the first and second connection patterns CP1 and CP2 may be disposed below the first and second sensing parts SP1 and SP2, the first and second pen sensing parts PSP1 and PSP2, and the first and second extension patterns EP1 and EP2.

The lower ends of a pair of 1-1-th pen sensing electrodes PSE1-1 may be connected via a corresponding third connection pattern CP3 among the third connection patterns CP3 shown in FIG. 7. The third connection patterns CP3 may be disposed on the same layer as the first and second connection patterns CP1 and CP2. In other words, the third connection patterns CP3 may be disposed below the 1-1-th pen sensing electrodes PSE1-1.

In FIG. 7, the first sensing lines TL and the third connection patterns CP3 may extend to cross each other while being insulated from each other. For example, the first sensing lines TL may be disposed on the same layer as the first sensing parts SP1 adjacent to the lower side of the active area AA and may extend from the first sensing parts SP1.

The third connection patterns CP3 may be disposed below the first sensing lines TL and may extend to cross the first sensing lines TL. An insulating layer may be disposed between the third connection patterns CP3 and the first sensing lines TL. The first pen sensing lines PSL1 may be disposed on the same layer as the third connection patterns CP3 and may extend from the third connection patterns CP3. An insulating layer may be disposed between the first sensing lines TL and the first pen sensing lines PSL1.

Referring to FIG. 7, the sensor ISP may have a rectangular shape with long sides extending in the first direction DR1 and short sides extending in the second direction DR2. Accordingly, the first sensing electrodes SE1 may be longer than the second sensing electrodes SE2. In addition, the 1-1-th pen sensing electrodes PSE1-1 may be longer than the 2-1-th pen sensing electrodes PSE2-1.

A resistance may be proportional to the length of a conductor. The resistance according to the length of a conductor may be referred to as a line resistance. Accordingly, the line resistance of the first sensing electrodes SE1 may be greater than the line resistance of the second sensing electrodes SE2. In addition, the line resistance of the 1-1-th pen sensing electrodes PSE1-1 may be greater than the line resistance of the 2-1-th pen sensing electrodes PSE2-1.

The first and second connection patterns CP1 and CP2 may be referred to as bridges. When conductors are connected to bridges disposed on a different layer from the conductors, a resistance of an electrode formed of the conductors and the bridges may increase.

In another embodiment of the present disclosure, connection patterns may be used for the first sensing electrodes SE1 and the 1-1-th pen sensing electrodes PSE1-1 and extension patterns may be used for the second sensing electrodes SE2 and the 2-1-th pen sensing electrodes PSE2-1. In other words, connection patterns disposed below the first sensing parts SP1 and the first pen sensing parts PSP1 may connect the first sensing parts SP1 and the first pen sensing parts PSP1. In addition, extension patterns integrally formed with the second sensing parts SP2 and the second pen sensing parts PSP2 may extend from the second sensing parts SP2 and the second pen sensing parts PSP2.

When connection patterns are used for the first sensing electrodes SE1 and the 1-1-th pen sensing electrodes PSE1-1, which are formed longer to have a large line resistance, the line resistance of the first sensing electrodes SE1 and the 1-1-th pen sensing electrodes PSE1-1 may increase. Therefore, in an embodiment of the present disclosure, the first and second connection patterns CP1 and CP2 may be used for the second sensing electrodes SE2 and the 2-1-th pen sensing electrodes PSE2-1 having a smaller length and relatively low line resistance.

Referring to FIGS. 7 and 8, the sensor ISP may include a plurality of 1-2-th pen sensing electrodes PSE1-2, a plurality of 2-2-th pen sensing electrodes PSE2-2, and a plurality of dummy electrodes DME. For example, the 1-2-th pen sensing electrodes PSE1-2 overlapping the first and second sensing electrodes SE1 and SE2 and the 1-1-th and 2-1-th pen sensing electrodes PSE1-1 and PSE2-1, the 2-2-th pen sensing electrodes PSE2-2, and the dummy electrodes DME are indicated by dotted lines in FIG. 8.

Referring to FIGS. 8 and 9, the 1-2 pen sensing electrodes PSE1-2 may be disposed on a different layer from the 1-1-th pen sensing electrode PSE1-1. For example, the 1-2-th pen sensing electrodes PSE1-2 may be disposed below the 1-1-th pen sensing electrode PSE1-1. The 1-2-th pen sensing electrodes PSE1-2 may be disposed on a different layer from the first sensing electrode SE1. For example, the 1-2-th pen sensing electrodes PSE1-2 may be disposed below the first sensing electrode SE1.

The 1-2-th pen sensing electrodes PSE1-2 may be disposed below the first sensing parts SP1, the first pen sensing parts PSP1, and the first and second extension patterns EP1 and EP2. The 1-2-th pen sensing electrodes PSE1-2 may be disposed on the same layer as the first and second connection patterns CP1 and CP2.

When viewed from a plan view, the 1-2-th pen sensing electrodes PSE1-2 may overlap a portion of the 1-1-th pen sensing electrode PSE1-1 and a portion of the first sensing electrode SE1. For example, when viewed from a plan view, the 1-2-th pen sensing electrodes PSE1-2 may overlap the first pen sensing parts PSP1, respectively. The 1-2-th pen sensing electrodes PSE1-2 may overlap portions of the second extension patterns EP2. The 1-2-th pen sensing electrodes PSE1-2 may overlap portions of the first sensing parts SP1.

The area of the 1-2-th pen sensing electrodes PSE1-2 overlapping the first sensing parts SP1 shown in FIG. 9 is shown as an example and may be adjusted in various ways. For example, when viewed from a plan view, the 1-2-th pen sensing electrodes PSE1-2 may be arranged to overlap the entirety of the first sensing parts SP1.

The 1-2-th pen sensing electrodes PSE1-2 may be electrically connected to the 1-1-th pen sensing electrode PSE1-1 via first contact holes P-CH1. The first contact holes P-CH1 may be formed in an insulating layer disposed between the 1-1-th pen sensing electrode PSE1-1 and the 1-2-th pen sensing electrodes PSE1-2. When viewed from a plan view, the first contact holes P-CH1 may overlap the second extension patterns EP2.

The 2-2-th pen sensing electrodes PSE2-2 may be disposed on a different layer from a portion of the 2-1-th pen sensing electrode PSE2-1. For example, the 2-2-th pen sensing electrodes PSE2-2 may be disposed below the second pen sensing parts PSP2 of the 2-1-th pen sensing electrode PSE2-1. The 2-2-th pen sensing electrodes PSE2-2 may be disposed on a different layer from a portion of the second sensing electrode SE2. For example, the 2-2-th pen sensing electrodes PSE2-2 may be disposed below the second sensing parts SP2 of the second sensing electrode SE2.

The 2-2-th pen sensing electrodes PSE2-2 may be disposed below the first and second sensing parts SP1 and SP2, the first and second pen sensing parts PSP1 and PSP2, and the first and second extension patterns EP1 and EP2. The 2-2-th pen sensing electrodes PSE2-2 may be disposed on the same layer as the 1-2-th pen sensing electrodes PSE1-2 and the first and second connection patterns CP1 and CP2.

When viewed from a plan view, the 2-2-th pen sensing electrodes PSE2-2 may overlap a portion of the 2-1-th pen sensing electrode PSE2-1 and a portion of the second sensing electrode SE2. For example, when viewed from a plan view, the 2-2-th pen sensing electrodes PSE2-2 may overlap the second pen sensing parts PSP2, respectively. The 2-2-th pen sensing electrodes PSE2-2 may overlap portions of the dummy extensions DEP. The 2-2-th pen sensing electrodes PSE2-2 may overlap portions of the second sensing parts SP2.

The area of the 2-2-th pen sensing electrodes PSE2-2 overlapping the second sensing parts SP2 shown in FIG. 9 is shown as an example and may be adjusted in various ways. For example, when viewed from a plan view, the 2-2-th pen sensing electrodes PSE2-2 may be disposed to overlap the entirety of the second sensing parts SP2 except for portions connected to the second connection patterns CP2.

The 2-2-th pen sensing electrodes PSE2-2 may be electrically connected to the 2-1-th pen sensing electrode PSE2-1 via second contact holes P-CH2. The second contact holes P-CH2 may be formed in an insulating layer disposed between the 2-1-th pen sensing electrode PSE2-1 and the 2-2-th pen sensing electrodes PSE2-2. When viewed from a plan view, the second contact holes P-CH2 may overlap the dummy extensions DEP.

When viewed from a plan view, portions of the 1-2-th pen sensing electrodes PSE1-2 overlapping the first sensing electrode SE1 may be referred to as first overlapping portions OVA1. The first overlapping portions OVA1 may be portions of the 1-2-th pen sensing electrodes PSE1-2 overlapping the first sensing parts SP1. The first overlapping portions OVA1 are illustrated by slanted lines in FIGS. 8 and 9. The first overlapping portions OVA1 are present in corners of the 1-2-th pen sensing electrodes PSE1-2.

When viewed from a plan view, portions of the 2-2-th pen sensing electrodes PSE2-2 overlapping the second sensing electrode SE2 may be referred to as second overlapping portions OVA2. The second overlapping portions OVA2 may be portions of the 2-2-th pen sensing electrodes PSE2-2 overlapping the second sensing parts SP2. For example, the first overlapping portions OVA1 may have the same area as the second overlapping portions OVA2, respectively.

The dummy electrodes DME may be disposed around the 1-2-th pen sensing electrodes PSE1-2. For example, a pair of the dummy electrodes DME may face each other with one of the 1-2-th pen sensing electrodes PSE1-2 disposed therebetween. In addition, the dummy electrodes DME may be disposed around the 2-2-th pen sensing electrodes PSE2-2. The dummy electrodes DME may be disposed on the same layer as the first and second connection patterns CP1 and CP2 and the 1-2-th and 2-2-th pen sensing electrodes PSE1-2 and PSE2-2.

The dummy electrodes DME may overlap a portion of the first sensing electrode SE1 and a portion of the second sensing electrode SE2. For example, the dummy electrodes DME may overlap portions of the first sensing parts SP1 and portions of the second sensing parts SP2.

Figure 10:
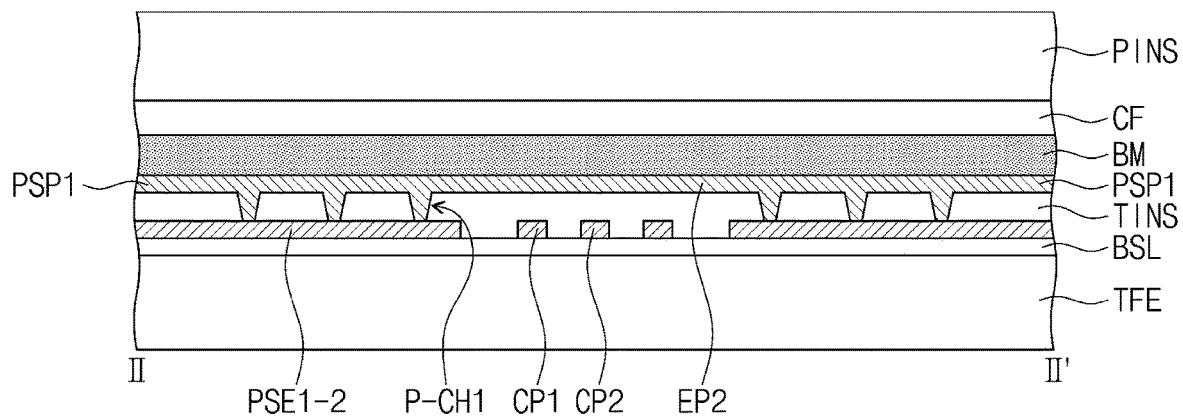
FIG. 10 is a cross-sectional view taken along line II-II' shown in FIG. 8.

FIG. 10 is a cross-sectional view taken along line II-II' shown in FIG. 8.

Referring to FIG. 10, the base layer BSL may be disposed on the thin film encapsulation layer TFE and the first and second connection patterns CP1 and CP2 may be disposed on the base layer BSL. The 1-2-th pen sensing electrodes PSE1-2 may be disposed on the base layer BSL. The first and second connection patterns CP1 and CP2 may be disposed between the 1-2-th pen sensing electrodes PSE1-2. The first and second connection patterns CP1 and CP2 and the 1-2-th pen sensing electrodes PSE1-2 may be formed by the aforementioned first conductive pattern CTL1.

The insulating layer TINS may be disposed on the base layer BSL to cover the first and second connection patterns CP1 and CP2 and the 1-2-th pen sensing electrodes PSE1-2. The second extension pattern EP2 may be disposed on the insulating layer TINS. The first pen sensing parts PSP1 integrally formed with the second extension pattern EP2 may also be disposed on the insulating layer TINS. The first pen sensing parts PSP1 and the second extension pattern EP2 may be formed by the aforementioned second conductive pattern CTL2.

The first pen sensing parts PSP1 may be connected to the 1-2-th pen sensing electrodes PSE1-2 via the first contact holes P-CH1 formed in the insulating layer TINS. Accordingly, the 1-2-th pen sensing electrodes PSE1-2 may be electrically connected to the 1-1-th pen sensing electrode PSE1-1 via the first contact holes P-CH1 formed in the insulating layer TINS.

The black matrix BM may be disposed on the insulating layer TINS to cover the first pen sensing parts PSP1 and the second extension pattern EP2. The color filter CF may be disposed on the black matrix BM, and the planarization insulating layer PINS may be disposed on the color filter CF.

Figure 11:
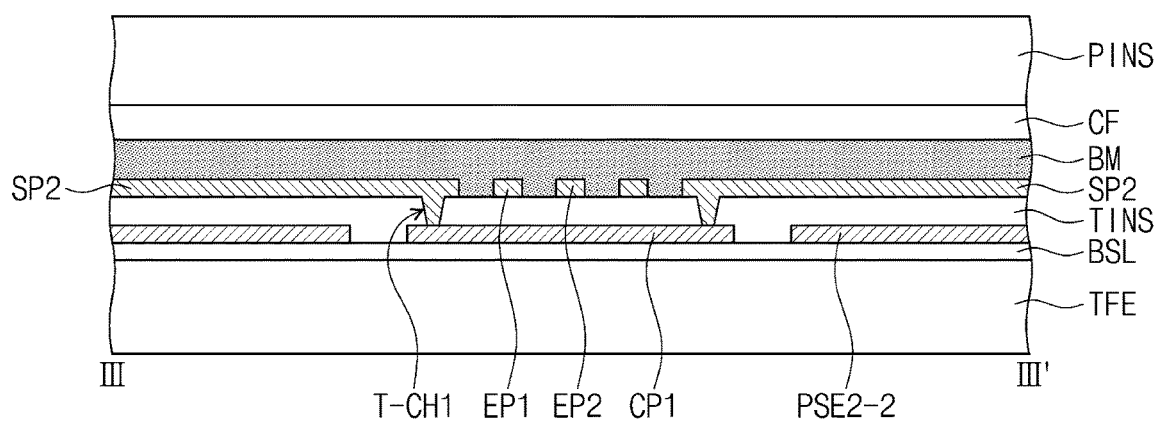
FIG. 11 is a cross-sectional view taken along line III-III' shown in FIG. 8.

FIG. 11 is a cross-sectional view taken along line III-III' shown in FIG. 8.

Referring to FIG. 11, the first connection pattern CP1 and the 2-2-th pen sensing electrodes PSE2-2 may be disposed on the base layer BSL. The first connection pattern CP1 may be disposed between the 2-2-th pen sensing electrodes PSE2-2. The 2-2-th pen sensing electrodes PSE2-2 may be formed by the aforementioned first conductive pattern CTL1.

The insulating layer TINS may be disposed on the base layer BSL to cover the first connection pattern CP1 and the 2-2-th pen sensing electrodes PSE2-2. The first and second extension patterns EP1 and EP2 and the second sensing parts SP2 may be disposed on the insulating layer TINS. The first and second extension patterns EP1 and EP2 may be disposed between the second sensing parts SP2.

The first extension patterns EP1 and the second sensing parts SP2 may be formed by the aforementioned second conductive pattern CTL2. The first sensing parts SP1 integrally formed with the first extension patterns EP1 may also be disposed on the insulating layer TINS.

The second sensing parts SP2 may be connected to the first connection pattern CP1 via the first contact holes T-CH1 formed in the insulating layer TINS. The second sensing parts SP2 may be electrically connected by the first connection pattern CP1.

The black matrix BM may be disposed on the insulating layer TINS to cover the first and second extension patterns EP1 and EP2 and the second sensing parts SP2, and the color filter CF and the planarization insulating layer PINS may be sequentially disposed on the black matrix BM.

Figure 12:
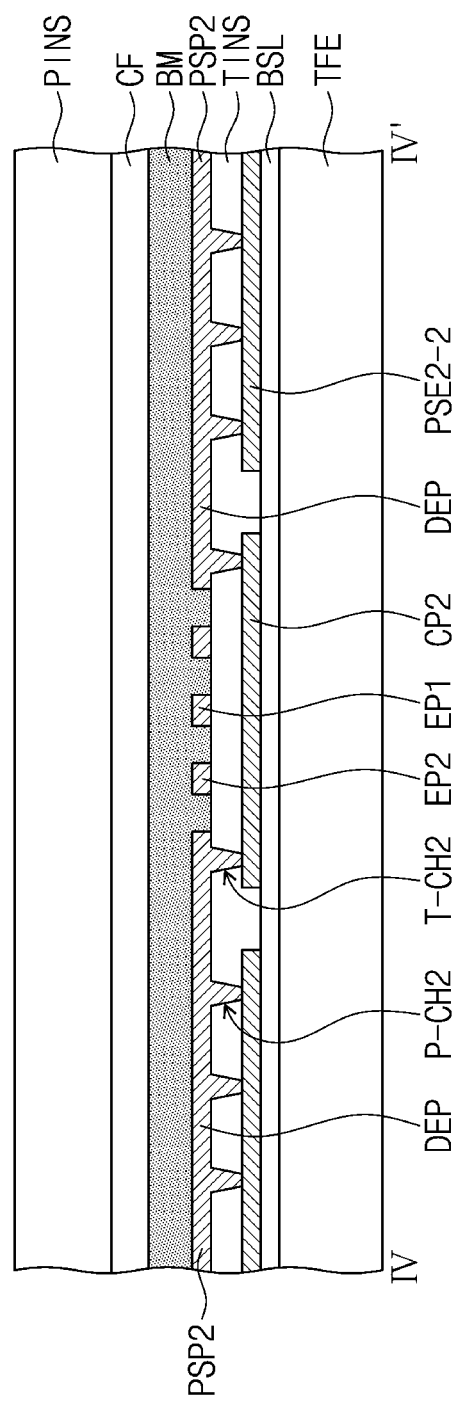
FIG. 12 is a cross-sectional view taken along the line IV-IV' shown in FIG. 8.

FIG. 12 is a cross-sectional view taken along the line IV-IV' shown in FIG. 8.

Referring to FIG. 12, the second connection pattern CP2 and the 2-2-th pen sensing electrodes PSE2-2 may be disposed on the base layer BSL. The second connection pattern CP2 may be disposed between the 2-2-th pen sensing electrodes PSE2-2.

The insulating layer TINS may be disposed on the base layer BSL to cover the second connection pattern CP2 and the 2-2-th pen sensing electrodes PSE2-2. The first and second extension patterns EP1 and EP2, the second pen sensing parts PSP2, and the dummy extensions DEP may be disposed on the insulating layer TINS. The first and second extension patterns EP1 and EP2 may be disposed between the second pen sensing parts PSP2. For example, the first and second extension patterns EP1 and EP2 may be disposed between the dummy extensions DEP.

The second pen sensing parts PSP2 and the dummy extensions DEP may be formed by the aforementioned second conductive pattern CTL2. The second pen sensing parts PSP2 may be connected to the second connection pattern CP2 via the second contact holes T-CH2 formed in the insulating layer TINS. The second pen sensing parts PSP2 may be electrically connected by the second connection pattern CP2.

The second pen sensing parts PSP2 may be connected to the 2-2-th pen sensing electrodes PSE2-2 via the second contact holes P-CH2 formed in the insulating layer TINS. Accordingly, the 2-2-th pen sensing electrodes PSE2-2 may be electrically connected to the 2-1-th pen sensing electrode PSE2-1 via the second contact holes P-CH2 defined in the insulating layer TINS.

The black matrix BM may be disposed on the insulating layer TINS to cover the first and second extension patterns EP1 and EP2, the second pen sensing parts PSP2, and the dummy extensions DEP.

Figure 13:
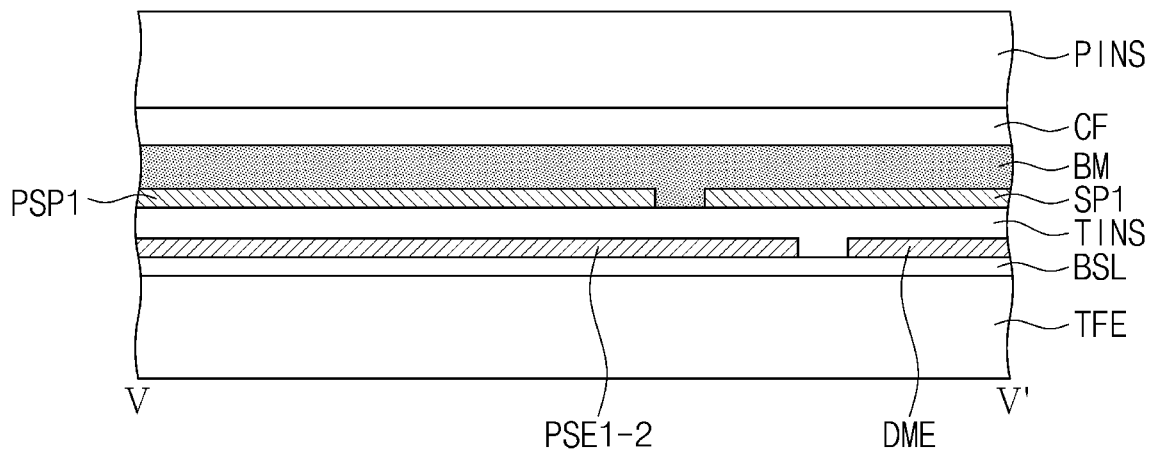
FIG. 13 is a cross-sectional view taken along line V-V' shown in FIG. 8.

FIG. 13 is a cross-sectional view taken along line V-V' shown in FIG. 8.

Referring to FIG. 13, the 1-2-th pen sensing electrodes PSE1-2 and the dummy electrode DME may be disposed on the base layer BSL. The insulating layer TINS may be disposed on the base layer BSL to cover the 1-2-th pen sensing electrode PSE1-2 and the dummy electrode DME. The first pen sensing part PSP1 and the first sensing part SP1 may be disposed on the insulating layer TINS.

When viewed from a plan view, the 1-2-th pen sensing electrode PSE1-2 may overlap the first pen sensing part PSP1. When viewed from a plan view, the 1-2-th pen sensing electrode PSE1-2 may overlap a portion of the first sensing part SP1.

Cross-sectional structures of the 2-2-th pen sensing electrode PSE2-2, the dummy electrode DME, the second pen sensing part PSP2 and the second sensing part SP2 are substantially the same as those shown in FIG. 6.

The black matrix BM may be disposed on the insulating layer TINS to cover the first pen sensing part PSP1 and the first sensing part SP1.

The structure of the sensor ISP shown in FIGS. 7 to 13 is merely an example. A structure of the sensor ISP to which the present disclosure is applied may be variously changed.

Figure 14:
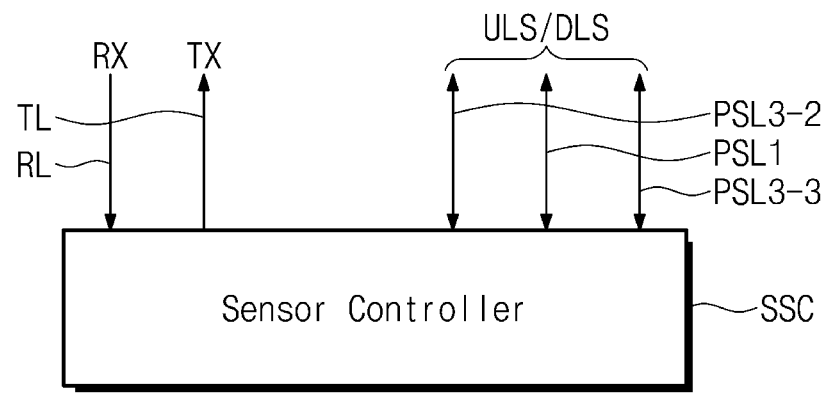
FIG. 14 is a diagram showing examples of transmission/reception signals of a sensor controller according to an embodiment of the present disclosure.

FIG. 14 is a diagram showing examples of transmission/reception signals of the sensor controller SSC according to an embodiment of the present disclosure.

Figure 15:
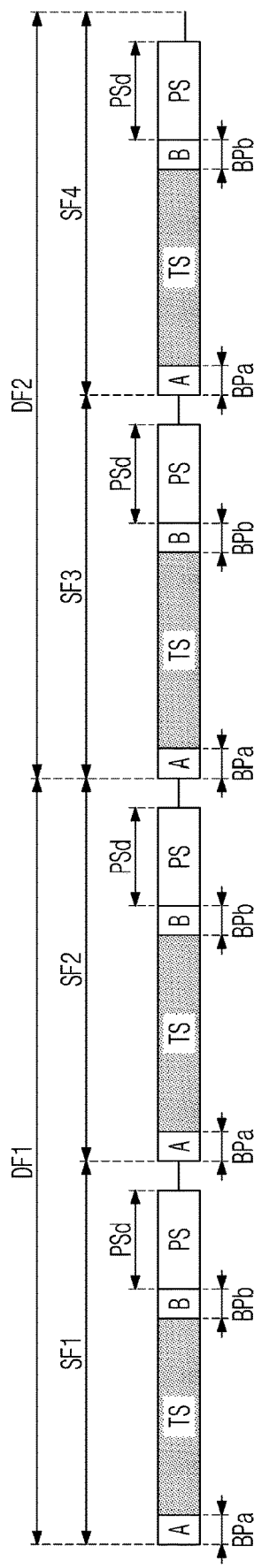
FIG. 15 is a diagram for describing an operation of a sensor controller according to an embodiment of the present disclosure.

FIG. 15 is a diagram for describing an operation of the sensor controller SSC according to an embodiment of the present disclosure.

Referring to FIGS. 4, 7, 14, and 15, the sensor controller SSC may operate alternately in a touch sensing mode and a pen sensing mode at regular periods. In other words, the touch sensing mode and the pen sensing mode may be operated in each of first, second, third and fourth sensing frames SF1, SF2, SF3, and SF4.

In one embodiment, the first and second sensing frames SF1 and SF2 may correspond to a first driving frame DF1, and the third and fourth sensing frames SF3 and SF4 may correspond to a second driving frame DF2. In other words, a single driving frame may correspond to two sensing frames.

Each of the first and second driving frames DF1 and DF2 may be a time period taken to display an image on all of the pixels PX shown in FIG. 6. Each of the first to fourth sensing frames SF1, SF2, SF3, and SF4 may be a time period taken to sense the first input TC1 and the second input TC2 from the sensing electrodes SE1 and SE2 shown in FIG. 7 and the 1-1-th, 1-2-th, 2-1-th, 2-2-th pen sensing electrodes PSE1-1, PSE1-2, PSE2-1, and PSE2-2.

In other words, the first input TC1 and the second input TC2 each may be sensed twice from the sensing electrodes SE1 and SE2 shown in FIG. 7 and the 1-1-th, 1-2-th, 2-1-th, 2-2-th pen sensing electrodes PSE1-1, PSE1-2, PSE2-1, and PSE2-2, while an image is displayed once on all the pixels PX shown in FIG. 6.

Each of the first to fourth sensing frames SF1, SF2, SF3, and SF4 may include a first blank period A, a touch sensing period TS, a second blank period B, and a pen sensing period PS. The first blank period A, the touch sensing period TS, the second blank period B, and the pen sensing period PS may occur in sequence.

The touch sensing period TS may be a period in which the sensor ISP and the sensor controller SSC operate in the touch sensing mode to sense the touch by a user, in other words, the first input TC1. The pen sensing period PS may be a period in which the sensor ISP and the sensor controller SSC operate in the pen sensing mode to sense a touch by the pen AP, in other words, the second input TC2.

The first blank period A may be a period between the beginning of each of the first to fourth sensing frames SF1, SF2, SF3, and SF4 and the touch sensing period TS. The second blank period B may be a period between the touch sensing period TS and the pen sensing period PS in each of the first to fourth sensing frames SF1, SF2, SF3, and SF4.

In one embodiment, the sensor controller SSC may output a transmission signal TX to the first sensing lines TL and receive a reception signal RX from the second sensing lines RL during the touch sensing mode. The operation of the sensor controller SSC during the touch sensing mode is not limited thereto. For example, the sensor controller SSC may output the transmission signal TX to the first sensing lines TL and the second sensing lines RL during the touch sensing mode, and receive the reception signal RX from the first sensing lines TL and the second sensing lines RL. The sensor controller SSC may acquire the coordinates of the first input TC1 based on the transmission signal TX and the reception signal RX during the touch sensing mode.

In one embodiment, the sensor controller SSC may transmit an uplink signal ULS to the pen sensing lines PSL1, PSL2, and PSL3-1 to PSL3-3 during the pen sensing mode, and receive a downlink signal DLS from the pen sensing lines PSL1, PSL2, and PSL3-1 to PSL3-3 in the pen sensing mode. In one embodiment, the sensor controller SSC may transmit the uplink signal ULS to some of the pen sensing lines PSL1, PSL2, and PSL3-1 to PSL3-3 during the pen sensing mode, and receive the downlink signal DLS from some of the pen sensing lines PSL1, PSL2, and PSL3-1 to PSL3-3 in the pen sensing mode.

The pen AP may be synchronized or paired with the sensor ISP in such a way that the sensor controller SSC provides the uplink signal ULS to the 1-1-th, 1-2-th, 2-1-th, and 2-2-th pen sensing electrodes PSE1-1, PSE1-2, PSE2-1, and PSE2-2 via the pen sensing lines PSL1, PSL2, and PSL3-1 to PSL3-3. After the pen AP is paired with the sensor ISP, the downlink signal DLS transmitted from the pen AP may be transmitted to the sensor controller SSC via the 1-1-th, 1-2-th, 2-1-th, and 2-2-th pen sensing electrodes PSE1-1, PSE1-2, PSE2-1, and PSE2-2 and the pen sensing lines PSL1, PSL2, and PSL3-1 to PSL3-3. The sensor controller SSC may acquire the coordinates of the second input TC2 of the pen AP based on the downlink signal DLS.

In the example shown in FIG. 15, in each of the first to fourth sensing frames SF1, SF2, SF3, and SF4, the first blank period "A" may have a predetermined duration BPa, and the second blank period "B" may have a predetermined duration BPb. In FIG. 15, the predetermined durations BPa and BPb may be substantially the same.

In other words, in each of the first to fourth sensing frames SF1, SF2, SF3, and SF4, the first blank period "A" and the second blank period "B" may have a certain duration. Depending on the characteristics of the sensor ISP, the duration of the touch sensing period TS and a duration PSd of the pen sensing period PS may need to be changed. In particular, when a period of time required for pairing the pen AP and the sensor ISP varies for display devices DD, the duration PSd of the pen sensing period PS may need to be changed.

Figure 16:
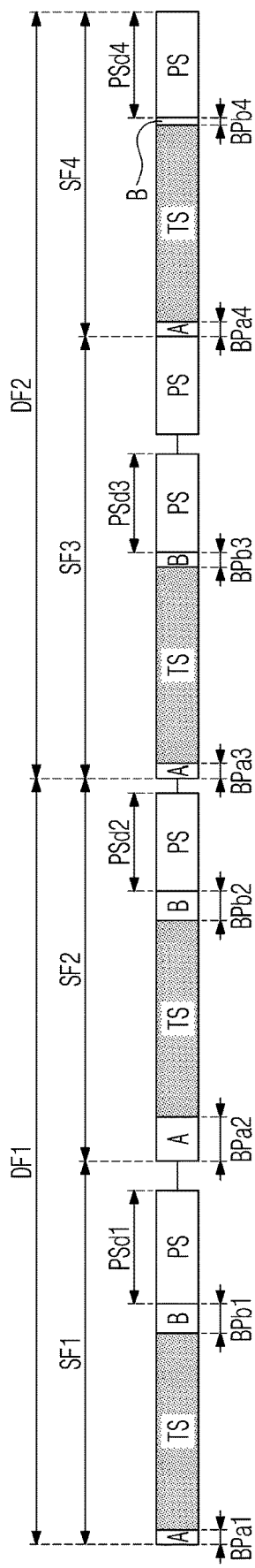
FIG. 16 is a diagram for describing an operation of a sensor controller according to an embodiment of the present disclosure.

FIG. 16 is a diagram for describing an operation of the sensor controller SSC according to an embodiment of the present disclosure.

Referring to FIGS. 4 and 16, the durations of the first blank period "A" and the second blank period "B" may be different from each other in the first to fourth sensing frames SF1, SF2, SF3, and SF4.

In one embodiment, durations BPa1, BPa2, BPa3, and BPa4 of the respective first blank periods "A" of the first to fourth sensing frames SF1, SF2, SF3, and SF4 may be different from each other.

In one embodiment, durations BPb1, BPb2, BPb3, and BPb4 of the respective second blank periods "B" of the first to fourth sensing frames SF1, SF2, SF3, and SF4 may be different from each other.

In one embodiment, durations of the respective touch sensing periods TS of the first to fourth sensing frames SF1, SF2, SF3, and SF4 may be identical to each other.

In one embodiment, durations PSd1, PSd2, PSd3, and PSd4 of the respective pen sensing periods PS of the first to fourth sensing frames SF1, SF2, SF3, and SF4 may be different from each other. This may be due to the differences in the durations BPb1, BPb2, BPb3, and BPb4 of the respective second blank periods "B".

In a case where the periods of time of the first to fourth sensing frames SF1, SF2, SF3, and SF4 are fixed, when the pen sensing period PS in each of the first to fourth sensing frames SF1, SF2, SF3, and SF4 needs to be long enough, at least one of the duration of the first blank period "A" and the duration of the second blank period "B" may be shortened. In other words, at least one of the duration of the first blank period "A" and the duration of the second blank period "B" may be inversely proportional to the duration of the pen sensing period PS. For example, to increase the duration PSd1 of the pen sensing period PS in the first sensing frame SF1, at least one of the duration BPa1 of the first blank period "A" and the duration Bpb1 of the second blank period "B" may be shortened.

The durations of the first blank period "A", the touch sensing period TS, the second blank period "B", and the pen sensing period PS in each of the first to fourth sensing frames SF1, SF2, SF3, and SF4 may be variably set according to a period of time required for pairing the pen AP and the sensor ISP.

In one embodiment, when the sensor controller SSC determines that the pairing of the pen AP and the sensor ISP is not normally performed, the sensor controller SSC may adjust the durations of the first blank period "A", the second blank period "B", and the pen sensing period PS in each of the first to fourth sensing frames SF1, SF2, SF3, and SF4.

In one embodiment, during a generation phase, it is possible to detect characteristics of the sensor ISP and adjust the durations of the first blank period "A", the second blank period "B", and the pen sensing period PS in each of the first to fourth sensing frames SF1, SF2, SF3, and SF4 such that the pairing between the pen AP and the sensor ISP are sufficiently performed. Information on the durations of the first blank period "A", the second blank period "B", and the pen sensing period PS in each of the first to fourth sensing frames SF1, SF2, SF3, and SF4 may be stored in a memory in the sensor controller SSC.

Figure 17A:
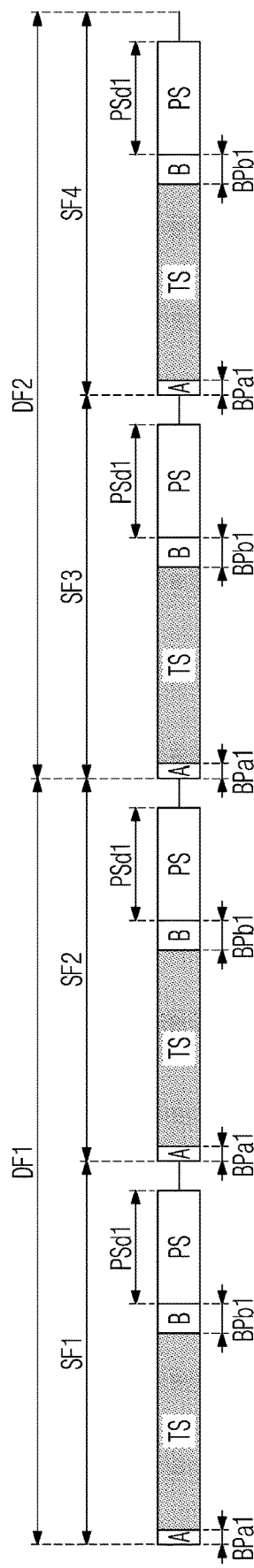
FIGS. 17A and 17B are diagrams for describing an operation of a sensor controller according to an embodiment of the present disclosure.
Figure 17B:
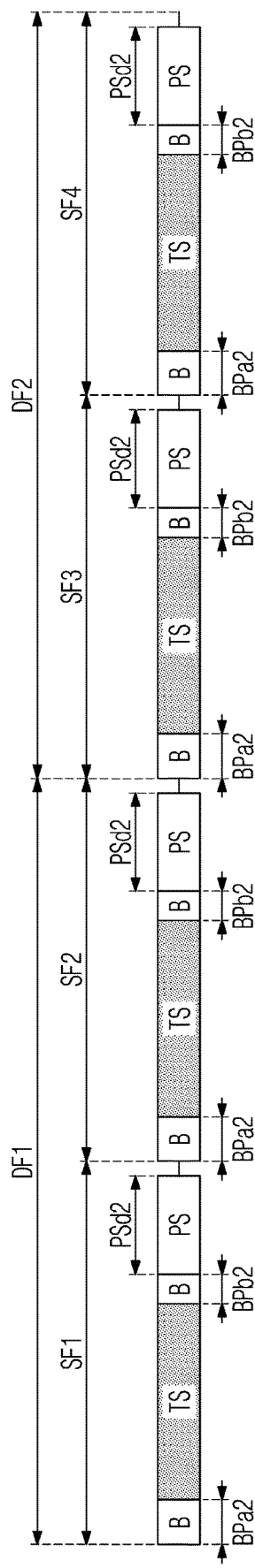

FIGS. 17A and 17B are diagrams for describing an operation of the sensor controller SSC according to an embodiment of the present disclosure.

Referring to FIGS. 4, 17A, and 17B, during a generation phase, it is possible to detect characteristics of the sensor ISP and determine the durations of the first blank period "A", the second blank period "B", and the pen sensing period PS in the sensing frame such that the pairing between the pen AP and the sensor ISP are sufficiently performed.

In one embodiment, as shown in FIG. 17A, the durations of the first blank period "A", the second blank period "B", and the pen sensing period PS in each of the first to fourth sensing frames SF1, SF2, SF3, and SF4 may be determined to be BPa1, BPb1 and PSd1 according to characteristics of the pairing between the pen AP and the sensor ISP.

In one embodiment, as shown in FIG. 17B, the durations of the first blank period "A", the second blank period "B", and the pen sensing period PS in each of the first to fourth sensing frames SF1, SF2, SF3, and SF4 may be determined to be BPa2, BPb2 and PSd2 according to characteristics of the pairing between the pen AP and the sensor ISP.

As shown in FIG. 17B, the sensor controller SSC may determine that more time is required for pairing the pen AP and the sensor ISP while maintaining the durations of the first blank period "A", the second blank period "B", and the pen sensing period PS as BPa2, BPb2, and PSd2. In this case, the sensor controller SSC may change the durations of the first blank period "A", the second blank period "B", and the pen sensing period PS to BPa1, BPb1, and PSd1 as shown in FIG. 17A. Here, relationships of BPa1<BPa2, BPb1<BPb2, and PSd1>PSd2 may be provided.

Figure 18:
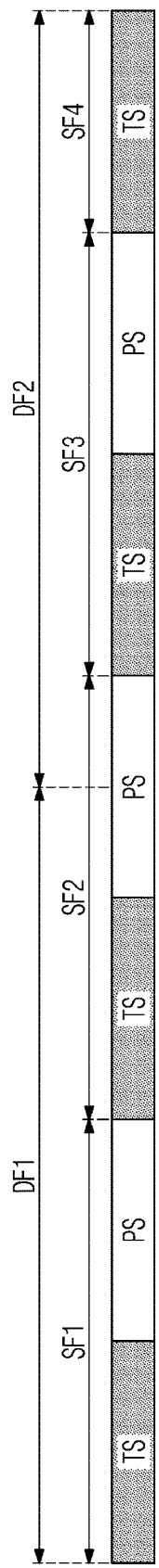
FIGS. 18 and 19 are diagrams for describing an operation of a sensor controller according to an embodiment of the present disclosure.
Figure 19:
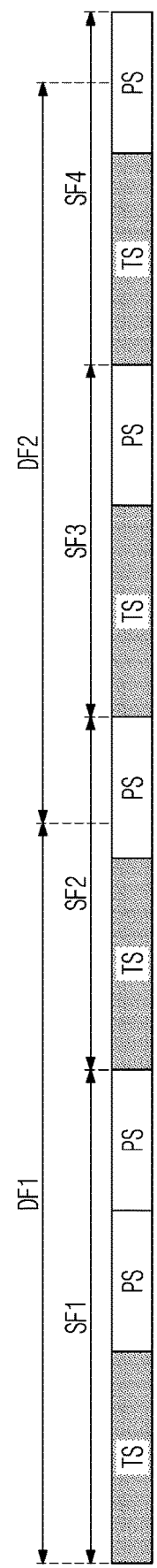

FIGS. 18 and 19 are diagrams for describing an operation of a sensor controller SSC according to an embodiment of the present disclosure.

In FIGS. 18 and 19, blank periods are omitted, and the touch sensing period TS and the pen sensing period PS are merely shown.

Referring to FIGS. 16, 17A, and 17B, each of the first and second driving frames DF1 and DF2 includes two sensing frames. As shown in FIGS. 18 and 19, the number of sensing frames included in a single driving frame may be variously changed.

In the example shown in FIG. 18, the first driving frame DF1 may include a first sensing frame SF1 and a portion of a second sensing frame SF2. The second driving frame DF2 may include a portion of the second sensing frame SF2, a third sensing frame SF3, and a fourth sensing frame SF4. For example, the first driving frame DF1 may include a first portion of the second sensing frame SF2 and the second driving frame DF2 may include a second portion of the second sensing frame SF2.

Each of the first, second, and third sensing frames SF1, SF2, and SF3 may include one touch sensing period TS and one pen sensing period PS, and the fourth sensing frame SF4 may include one touch sensing period TS alone.

In the example shown in FIG. 19, the first driving frame DF1 may include a first sensing frame SF1 and a first portion of a second sensing frame SF2. The second driving frame DF2 may include a second portion of the second sensing frame SF2, a third sensing frame SF3 and a first portion of a fourth sensing frame SF4.

The first sensing frame SF1 may include one touch sensing period TS and two pen sensing periods PS. As the first sensing frame SF1 includes two pen sensing periods PS, pen sensing performance of the sensor controller SSC may be improved. Each of the second, third, and fourth sensing frames SF2, SF3, and SF4 may include one touch sensing period TS and one pen sensing period PS.

Figure 20:
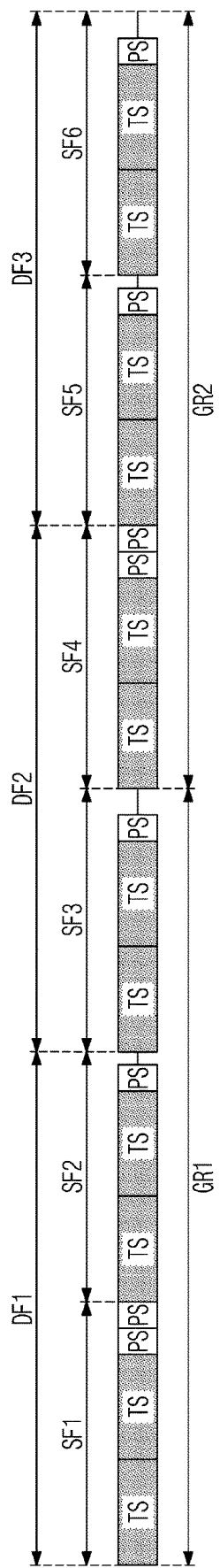
FIG. 20 is a diagram for describing an operation of a sensor controller according to an embodiment of the present disclosure.

FIG. 20 is a diagram for describing an operation of the sensor controller SSC according to an embodiment of the present disclosure.

Referring to FIG. 20, each of first, second, and third driving frames DF1, DF2, and D3 may include two sensing frames. In other words, the first driving frame DF1 may include first and second sensing frames SF1 and SF2. The second driving frame DF2 may include third and fourth sensing frames SF3 and SF4. The third driving frame DF3 may include fifth and sixth sensing frames SF5 and SF6.

Each of the first and fourth sensing frames SF1 and SF4 may include two touch sensing periods TS and two pen sensing periods PS1 and PS2. Each of the second, third, fifth, and sixth sensing frames SF2, SF3, SF5, and SF6 may include two touch sensing periods TS and one pen sensing period PS1 or PS2.

The first, second, and third sensing frames SF1, SF2, and SF3 may be included in a first group GR1, and the fourth, fifth, and sixth sensing frames SF4, SF5, and SF6 may be included in a second group GR2.

In other words, the sensor controller SSC may repeatedly operate in units of groups. For example, the sensor controller SSC may repeatedly operate in units of three sensing frames, in other words, first, second, and third sensing frames SF1, SF2, and SF3. The number of sensing frames included in one group may be variously changed.

As described above, the sensing performance of the sensor controller SCC may be improved by changing the durations of the touch sensing period TS in which the first input TC1 is sensed and the pen sensing period PC in which the second input TC2 is sensed, the number of times of sensing, a repetition cycle, and the like, variously according to the characteristics of the sensor ISP and the sensor controller SCC.

The input sensor for a display device having the configuration described above may sense a pen input as well as a touch input. Furthermore, production costs may be reduced by implementing a sensing circuit for sensing a touch input and a pen input with one circuit.

One sensing frame may include a touch sensing period for detecting a touch input and a pen sensing period. The duration of the pen sensing period within the sensing frame may be adjusted, resulting in improvement in pen sensing performance.

Although the present disclosure has been described above with reference to embodiments thereof, it will be understood by those skilled in the art that various modifications and changes may be made thereto without departing from the spirit and scope of the present disclosure as set forth in the claims below. Accordingly, the present disclosure is not intended to be limited by the embodiments set forth herein.

What is claimed is:

1. An input sensor comprising:
a sensor including a sensing electrode for sensing a touch input and a pen sensing electrode for sensing a pen input; and
a sensor controller configured to acquire a first coordinate based on a touch sensing signal received from the sensing electrode and acquire a second coordinate based on a pen sensing signal received from the pen sensing electrode during a first sensing frame,
wherein the first sensing frame includes a first blank period, a touch sensing period for sensing the touch input, and a pen sensing period for sensing the pen input,
wherein the first blank period, the touch sensing period, and the pen sensing period are sequentially arranged,
wherein a duration of the first blank period and a duration of the pen sensing period are adjustable based on a period of time required for pairing the pen and the sensor,
wherein, when a first time is required for pairing the pen and the sensor, the first blank period has a first blank time, and the pen sensing period has a first sensing time, and
wherein, when a second time longer than the first time is required for pairing a pen and the sensor, the first blank period has a second blank time shorter than the first blank time, and the pen sensing period has a second sensing time longer than the first sensing time.

2. The input sensor of claim 1, wherein the touch sensing period and the pen sensing period do not overlap each other during the first sensing frame.

3. The input sensor of claim 1, wherein the first blank period is a period between a beginning of the first sensing frame and the touch sensing period.

4. The input sensor of claim 3, wherein the first sensing frame further includes a second blank period between the touch sensing period and the pen sensing period, and
wherein a duration of the second blank period is adjustable.

5. The input sensor of claim 1, wherein the first sensing frame includes another touch sensing period.

6. The input sensor of claim 1, wherein the first sensing frame includes another pen sensing period.

7. The input sensor of claim 1, wherein the duration of the first blank period is decreased when the duration of the pen sensing period increases.

8. The input sensor of claim 1, wherein the sensor controller is configured to acquire the first coordinate and the second coordinate during a second sensing frame consecutive to the first sensing frame,
wherein the second sensing frame includes the first blank period, the touch sensing period, and the pen sensing period, and
wherein a duration of the first blank period of the second sensing frame is adjustable.

9. The input sensor of claim 8, wherein the durations of the first blank periods of the first and second sensing frames are different from each other, and
wherein the durations of the pen sensing periods of the first and second sensing frames are different from each other.

10. The input sensor of claim 9, wherein the sensor controller is configured to repeat the first and second sensing frames.

11. The input sensor of claim 1, wherein the sensing electrode includes a first sensing electrode and a second sensing electrode insulated from and crossing the first sensing electrode, wherein the pen sensing electrode includes:
a 1-1-th pen sensing electrode adjacent to the first sensing electrode and insulated from and crossing the second sensing electrode;
a 2-1-th pen sensing electrode adjacent to the second sensing electrode and insulated from and crossing the first sensing electrode and the 1-1-th pen sensing electrode; and
a 1-2-th pen sensing electrode disposed on a different layer from the first sensing electrode and the 1-1-th pen sensing electrode and overlapping a portion of the first sensing electrode on a plane.

12. The input sensor of claim 11, wherein the 1-2-th pen sensing electrode is electrically connected to the 1-1-th pen sensing electrode, and
wherein the 1-2-th pen sensing electrode overlaps a portion of the 1-1-th pen sensing electrode on the plane.

13. A display device comprising:
a display panel including a plurality of pixels;
a sensor disposed on the display panel and including a sensing electrode for sensing a touch input and a pen sensing electrode for sensing a pen input; and
a sensor controller configured to acquire a first coordinate based on a touch sensing signal received from the sensing electrode during a first sensing frame and acquire a second coordinate based on a pen sensing signal received from the pen sensing electrode during the first sensing frame,
wherein the first sensing frame includes a first blank period, a touch sensing period for sensing the touch input, and a pen sensing period for sensing the pen input,
wherein the first blank period, the touch sensing period, and the pen sensing period are sequentially arranged,
wherein a duration of the first blank period and a duration of the pen sensing period are adjustable based on a period of time required for pairing the pen and the sensor,
wherein, when a first time is required for pairing the pen and the sensor, the first blank period has a first blank time, and the pen sensing period has a first sensing time, and
wherein, when a second time longer than the first time is required for pairing a pen and the sensor, the first blank period has a second blank time shorter than the first blank time, and the pen sensing period has a second sensing time longer than the first sensing time.

14. The display device of claim 13, wherein the touch sensing period and the pen sensing period do not overlap each other during the first sensing frame.

15. The display device of claim 13, wherein the first blank period is a period between a beginning of the first sensing frame and the touch sensing period.

16. The display device of claim 15, wherein the first sensing frame further includes a second blank period between the touch sensing period and the pen sensing period, and
wherein a duration of the second blank period is adjustable.

17. The display device of claim 13, wherein the first sensing frame includes another touch sensing period.

18. The display device of claim 13, wherein the first sensing frame includes another pen sensing period.

19. The display device of claim 13, wherein the sensor controller is configured to acquire the first coordinate and the second coordinate during a second sensing frame consecutive to the first sensing frame,
wherein the second sensing frame includes the first blank period, the touch sensing period, and the pen sensing period,
wherein a duration of the first blank period of the second sensing frame is adjustable, and
wherein a driving frame for driving the pixels corresponds to the first sensing frame and the second sensing frame.

20. The display device of claim 13, wherein the sensing electrode includes a first sensing electrode and a second sensing electrode insulated from and crossing the first sensing electrode,
wherein the pen sensing electrode includes:
a 1-1-th pen sensing electrode adjacent to the first sensing electrode and insulated from and crossing the second sensing electrode;
a 2-1-th pen sensing electrode adjacent to the second sensing electrode and insulated from and crossing the first sensing electrode and the 1-1-th pen sensing electrode; and
a 1-2-th pen sensing electrode disposed on a different layer from the first sensing electrode and the 1-1-th pen sensing electrode and overlapping a portion of the first sensing electrode on a plane,
wherein the 1-2-th pen sensing electrode is electrically connected to the 1-1-th pen sensing electrode, and
wherein the 1-2-th pen sensing electrode overlaps a portion of the 1-1-th pen sensing electrode on the plane.

21. An electronic device comprising:
a display panel including a plurality of pixels;
a sensor disposed on the display panel and including a sensing electrode for sensing a touch input and a pen sensing electrode for sensing a pen input; and
a sensor controller configured to acquire a first coordinate based on a touch sensing signal received from the sensing electrode during a first sensing frame and acquire a second coordinate based on a pen sensing signal received from the pen sensing electrode during the first sensing frame,
wherein the first sensing frame includes a first blank period, a touch sensing period for sensing the touch input, and a pen sensing period for sensing the pen input,
wherein the first blank period, the touch sensing period, and the pen sensing period are sequentially arranged,
wherein a duration of the first blank period and a duration of the pen sensing period are adjustable based on a period of time required for pairing the pen and the sensor,
wherein, when a first time is required for pairing the pen and the sensor, the first blank period has a first blank time, and the pen sensing period has a first sensing time, and
wherein, when a second time longer than the first time is required for pairing a pen and the sensor, the first blank period has a second blank time shorter than the first blank time, and the pen sensing period has a second sensing time longer than the first sensing time.

* * * * *